(12) United States Patent
Springer

(10) Patent No.: US 12,307,679 B2
(45) Date of Patent: May 20, 2025

(54) VIRTUAL BACKGROUND SHARING

(71) Applicant: Zoom Communications, Inc., San Jose, CA (US)

(72) Inventor: Shane Paul Springer, Manchester, MI (US)

(73) Assignee: Zoom Communications, Inc., San Jose, CA (US)

( * ) Notice: Subject to any disclaimer, the term of this patent is extended or adjusted under 35 U.S.C. 154(b) by 390 days.

(21) Appl. No.: 17/710,192

(22) Filed: Mar. 31, 2022

(65) Prior Publication Data
US 2023/0316533 A1    Oct. 5, 2023

(51) Int. Cl.
| | |
|---|---|
| *G06T 7/194* | (2017.01) |
| *G06F 16/53* | (2019.01) |
| *G06T 5/50* | (2006.01) |
| *G06V 10/70* | (2022.01) |
| *H04L 65/1089* | (2022.01) |

(52) U.S. Cl.
CPC .............. *G06T 7/194* (2017.01); *G06F 16/53* (2019.01); *G06T 5/50* (2013.01); *G06V 10/70* (2022.01); *H04L 65/1089* (2013.01); *G06T 2207/20221* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 5,781,198 A | 7/1998 | Korn | |
| 6,853,398 B2 | 2/2005 | Malzbender et al. | |
| 6,909,806 B2 | 6/2005 | Li | |
| 8,081,821 B1 | 12/2011 | Schaem | |
| 8,279,254 B2 | 10/2012 | Goose et al. | |
| 9,269,157 B2 | 2/2016 | Saban et al. | |
| 9,460,117 B2 | 10/2016 | Jin | |
| 9,503,685 B2 | 11/2016 | Baron, Jr. et al. | |
| 9,948,893 B2 | 4/2018 | Barzuza et al. | |
| 11,082,661 B1 | 8/2021 | Pollefeys | |
| 11,146,520 B2 | 10/2021 | Lieb et al. | |

(Continued)

FOREIGN PATENT DOCUMENTS

| CN | 108830820 A | * | 11/2018 | ............... G06T 5/50 |
|---|---|---|---|---|
| CN | 110913267 A | * | 3/2020 | |
| CN | 113099265 A | * | 7/2021 | ............ G06K 9/342 |

OTHER PUBLICATIONS

Vimeo Livestream, Add a Virtual Background for Remote Guests—Livestream Help Center, https://help.livestream.com/hc/en-us/articles/360049429031-Add-a-Virtual-Background-for-Remote-Guests, Mar. 2022, 2 pages.

(Continued)

*Primary Examiner* — Jiangeng Sun

(74) *Attorney, Agent, or Firm* — Young Basile Hanlon & MacFarlane, P.C.

(57) ABSTRACT

A background-setting request for a target user device of a target conference participant is received. The background-setting request identifies a source conference participant. A source user device of the source conference participant is configured to use a virtual background (VBG) image. A replacement VBG is obtained based on the background-setting request and the VBG image of the source user device. The replacement VBG is used to set a VBG at the target user device.

20 Claims, 15 Drawing Sheets

(56) References Cited

U.S. PATENT DOCUMENTS

| | | | |
|---|---|---|---|
| 2008/0030621 A1 | | 2/2008 | Ciudad et al. |
| 2018/0276250 A1 | | 9/2018 | Badoiu |
| 2021/0352361 A1 | * | 11/2021 | Thomas .............. G06Q 30/0276 |
| 2021/0392175 A1 | | 12/2021 | Gronau et al. |
| 2022/0070389 A1 | * | 3/2022 | Tangeland ................ G06T 5/90 |
| 2022/0182716 A1 | * | 6/2022 | Thomas .............. G06Q 30/0242 |
| 2023/0412875 A1 | * | 12/2023 | Thomas .............. H04N 21/4788 |

OTHER PUBLICATIONS

Create Artistic Effect by Stylizing Image Background—Part 1: Project Intro, https://medium.com/google-developer-experts/image-background-stylizer-part-1-project-intro-d68c4547e7e3, Margaret Maynard-Reid, Nov. 24, 2020, 6 pages.

How To Run Your Brand's AR Filter Campaign, https://www.accessar.co/blog/how-to-run-an-instagram-ar-filter-campaign#:~:text=When you open the filter, unique link and share it!, May 4, 2021, 10 pages.

View or download Google Images—Chrome Web Store, https://chrome.google.com/webstore/detail/view-or-download-google-i/imdimpnalpmoohckmjdamjmfklhddcbg?hl=en, Mar. 2022, 6 pages.

How-To Geek, How to Change Windows 10's Wallpaper Based on Time of Day, https://www.howtogeek.com/355912/how-to-change-windows-10s-wallpaper-based on-time-of-day/, Chris Hoffman, Jun. 15, 2018, 19 pages.

Microsoft Windows Apps, Desktop Live Wallpapers. https://apps.microsoft.com/store/detail/desktop-live-wallpapers/9NZ370XBFQMG?hl=en-us&gl=US, May 31, 2022, 3 pages.

Gadget Hacks, Change Your Wallpaper Automatically by Time, Day, Location & More, https://android.gadgethacks.com/how-to/change-your-wallpaper-automatically-by-time-day-location-more-0172629, Dallas Thomas, Oct. 14, 2016, 8 pages.

Warmly: Professional Networking in Zoom, Look professional on Zoom, https://www.warmly.ai, May 31, 2022, 8 pages.

Youtube, Get a Contextually-Aware Wallpaper for Android [How-To], https://www.youtube.com/watch?v=KpdelkltyoA&T=78s, Gadget Hacks, Aug. 5, 2016, 3 pages.

* cited by examiner

VIRTUAL BACKGROUND SHARING

FIELD

This disclosure relates generally to communication management and, more specifically, to sharing virtual backgrounds between participants of virtual conferences.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
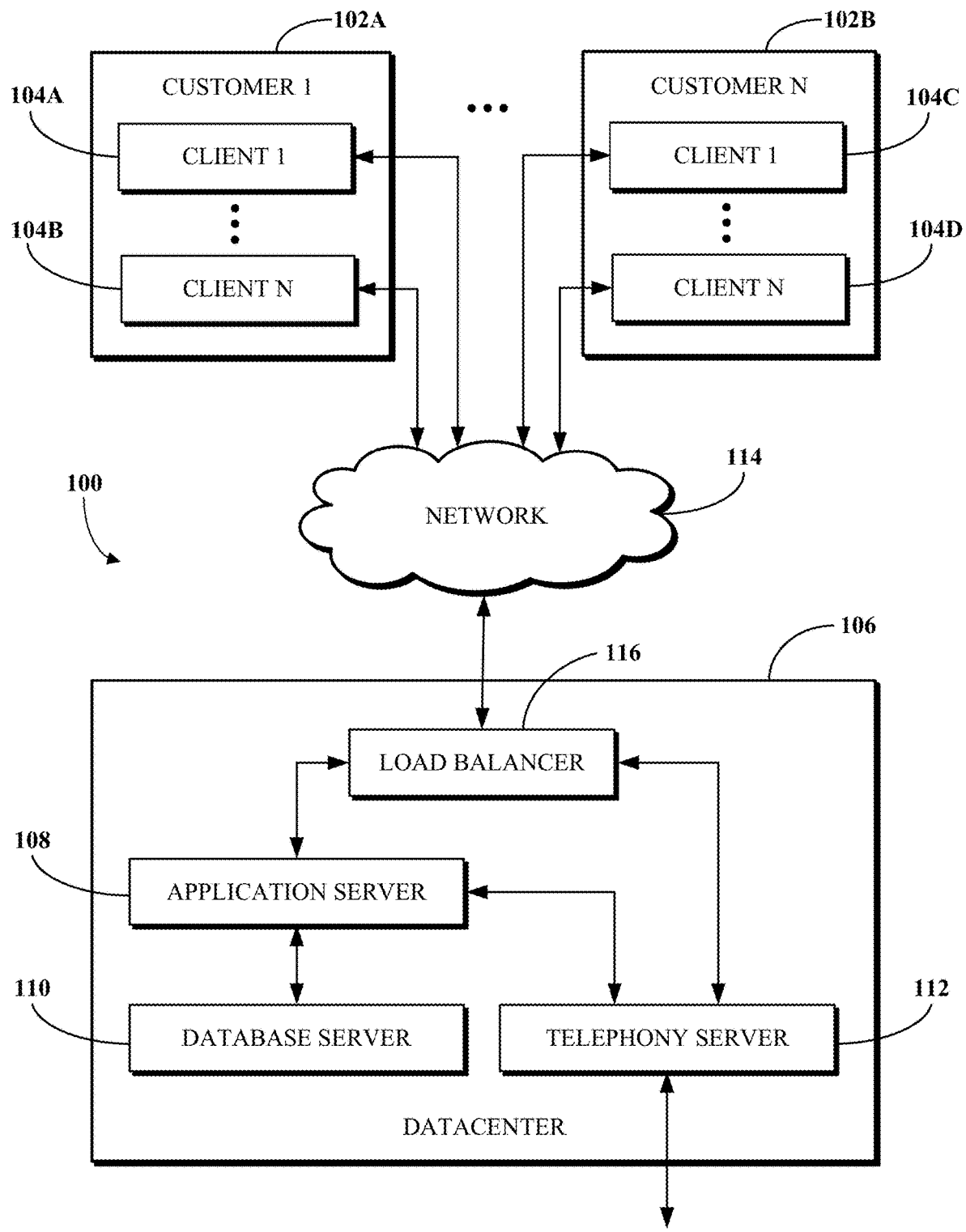
FIG. 1 is a block diagram of an example of an electronic computing and communications system.

A conferencing software, which may be standalone software or part of a software platform such as a unified communications as a service (UCaaS) platform, may allow conference participants to participate in audio-visual conferences. To visually participate in a conference, a user may enable use of their camera with the conferencing software. The conferencing software may obtain a video feed of the participant for transmission to other participants of the conference. The participant whose video feed is obtained is referred to herein as a "user" or "participant," and the participants to whom a video feed showing the user is transmitted are referred to herein as the "other participants."

A background replacement media item may be used in place of the actual background of the user. A background replacement media item may also be referred to as a virtual background (VBG). A VBG is media data used to mask (e.g., overlay, overwrite, or replace) portions of one or more images of a video feed of the user. The portion of an image that is masked by the VBG is referred to herein as a background segment of the image. The VBG may be a single image or may include multiple images. For example, the VBG may be an image file, a video file, an animation file (such as a Graphics Interchange Format (GIF) file), or a streaming video.

A user may select a VBG within a client-side conferencing software (e.g., a conferencing software that is included in an application executable on a device of the user, such as a client application) or may be pre-selected for the user (e.g., by an employer of the user). In an example, the user may explicitly select a specific file or stream that the conferencing software is to use as the VBG. In another example, the user may select the VBG from a catalogue of available VBGs.

The conferencing software or a component (e.g., tool, software, application) associated therewith may process images (e.g., video frames) of an image stream (e.g., a video feed or video stream) of the user to replace the actual background captured by the camera with a corresponding (e.g., co-located and co-extensive) portion from the VBG. An image that is captured by the camera of the user is referred to herein as a "camera image;" and the image of the user that is transmitted to the other participants for display is referred to herein as an "output image."

A camera image typically includes a likeness of the user (i.e., an image of the user) and other image data. A segmentation software may segment a camera image into a foreground segment that includes at least a substantial portion of the likeness of the user, and a background segment that includes at least a substantial portion of the remainder of the camera image. To illustrate, if the user is sitting in front of the camera, the foreground segment may include the portion of the user within a field of view of the camera (e.g., their head and torso) and potentially one or more objects (e.g., a desk, a keyboard, and/or a mouse) that may be within the field of view of the camera; and the background segment may include everything else in the camera image.

It is noted that the foreground segment or the background segment may include disjointed (e.g., disconnected or otherwise non-continuous) portions of a camera image. In some configurations, the one or more objects may be considered part of the background segment rather than part of the foreground segment. For simplicity of explanation, the foreground segment is assumed to include the likeness of the user and the background segment is assumed to include the remainder of the image data of the camera image.

As mentioned, the background segment of a camera image may be replaced with a corresponding (e.g., co-located and co-extensive) portion from the VBG. The corresponding portion from the VBG is referred to herein as the "replacement background portion" (RBGP). In an example, the conferencing software may be server-based (e.g., executed on a server). In another example, the component associated with the conferencing software may be software that executes at the edge (e.g., at a user device of the user). For example, the component associated with the conferencing software may be an application that is installed on the user device and communicates with a server-based conferring application therewith enabling the user to participate in conferences.

The foreground segment may be overlaid on the VBG to obtain an output image. Equivalently, or similarly, the foreground segment may be combined with the RBGP to obtain the output image. The output image may be transmitted for display on respective display devices of the other participants.

In some situations, it may be desirable to use the VBG or a portion thereof of one conference participant to set the VBG for one or more other conference participants of a same virtual conference. The conference participant whose VBG is used to obtain a VBG for one or more other participants is referred to as a "source conference participant;" and a conference participant for whom a VBG is obtained (e.g., set) based on the VBG of a source conference participant is referred to as a "target conference participant." A VBG of a source conference participant is referred to as a "source VBG;" and a VBG obtained for the target conference participant is referred to as a "target VBG." A device of the source conference participant is referred to as a "source device;" and a device of a target conference participant is referred to as a "target device." Statements such as "a tool/software/etc. of a source conference participant" should be understood to mean a "a tool/software/etc. that is executing or is available at a source device of the source conference participant;" and statements such as "a tool/software/etc. of a target conference participant" should be understood to mean a "a tool/software/etc. that is executing or is available at a target device of the target conference participant." In some situations, and as further described below, a list of target conference participants may include a source target participant.

To give a few illustrative examples, a target conference participant may desire to set their virtual background to the source VBG of a source conference participant; the target conference participant may desire to set their virtual background to a background that has a same theme as the source VBG; the target conference participant may desire to set their virtual background to a background that includes objects similar to at least some of the objects of the source VBG; or the VBG of a source conference participant may be spread to other conference participants. Spreading the VBG of a source conference participant to target conference participants can include setting the VBGs of the target conference participants based on at least a portion of the source VBG.

Conventional conferencing software lack the technical capabilities for solving the above problems. At best, and as described, conventional conferencing software may merely include technical capabilities that a conference participant can use to provide a VBG to the conferencing software or include technical capabilities that allow a conference participant to select a VBG from a catalogue of VBGs that the conferencing software may provide.

Implementations of this disclosure address problems such as these by enabling VBG sharing between conference participants. Virtual background sharing includes setting the VBG of at least one conference participant (i.e., at least one target conference participant) based on the VBG of another conference participant (i.e., a source conference participant).

To describe some implementations in greater detail, reference is first made to examples of hardware and software structures used to implement VBG sharing whereby the VBG of target conference participants can be set based on a source VBG of a source conference participant. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
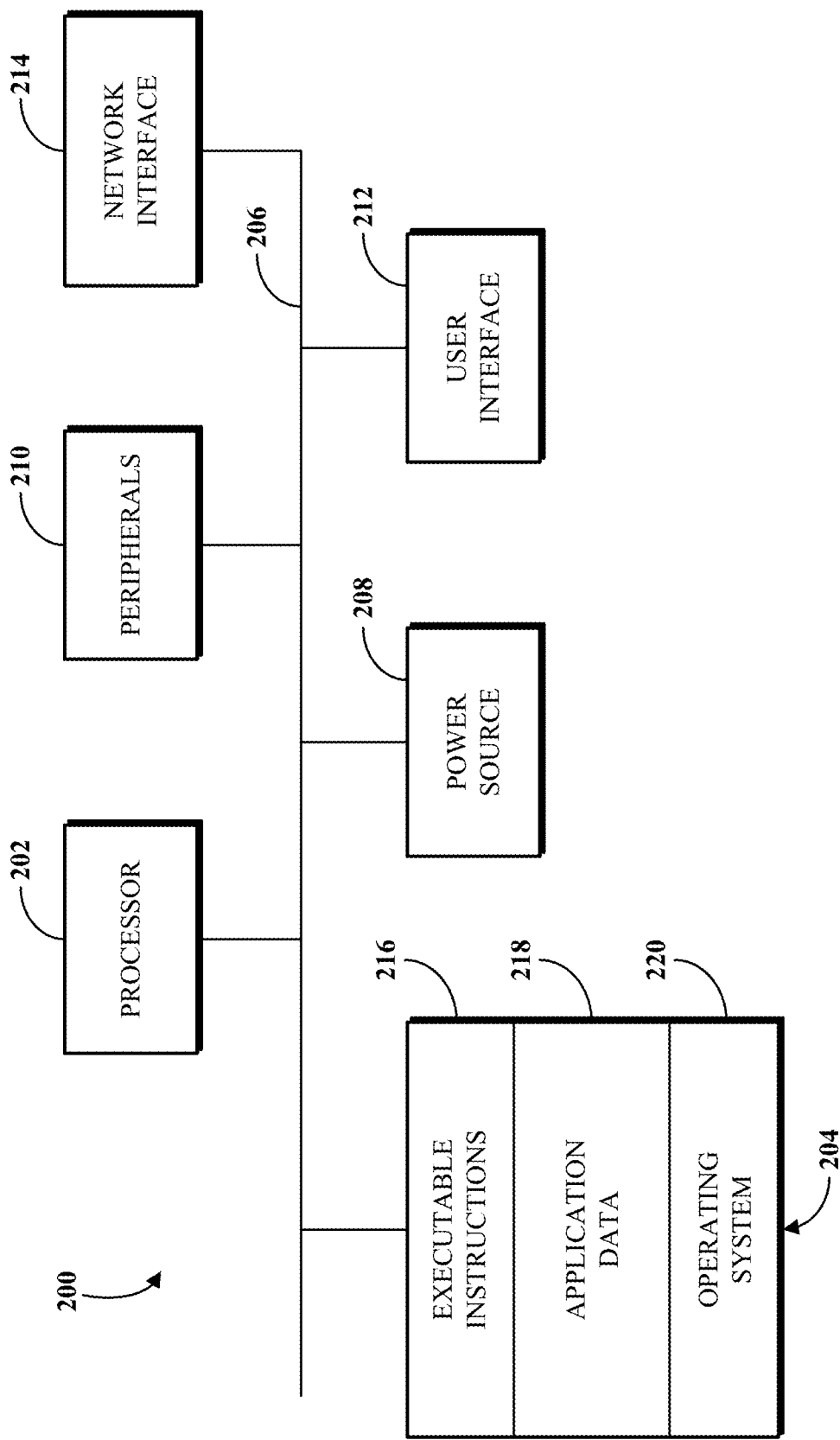
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
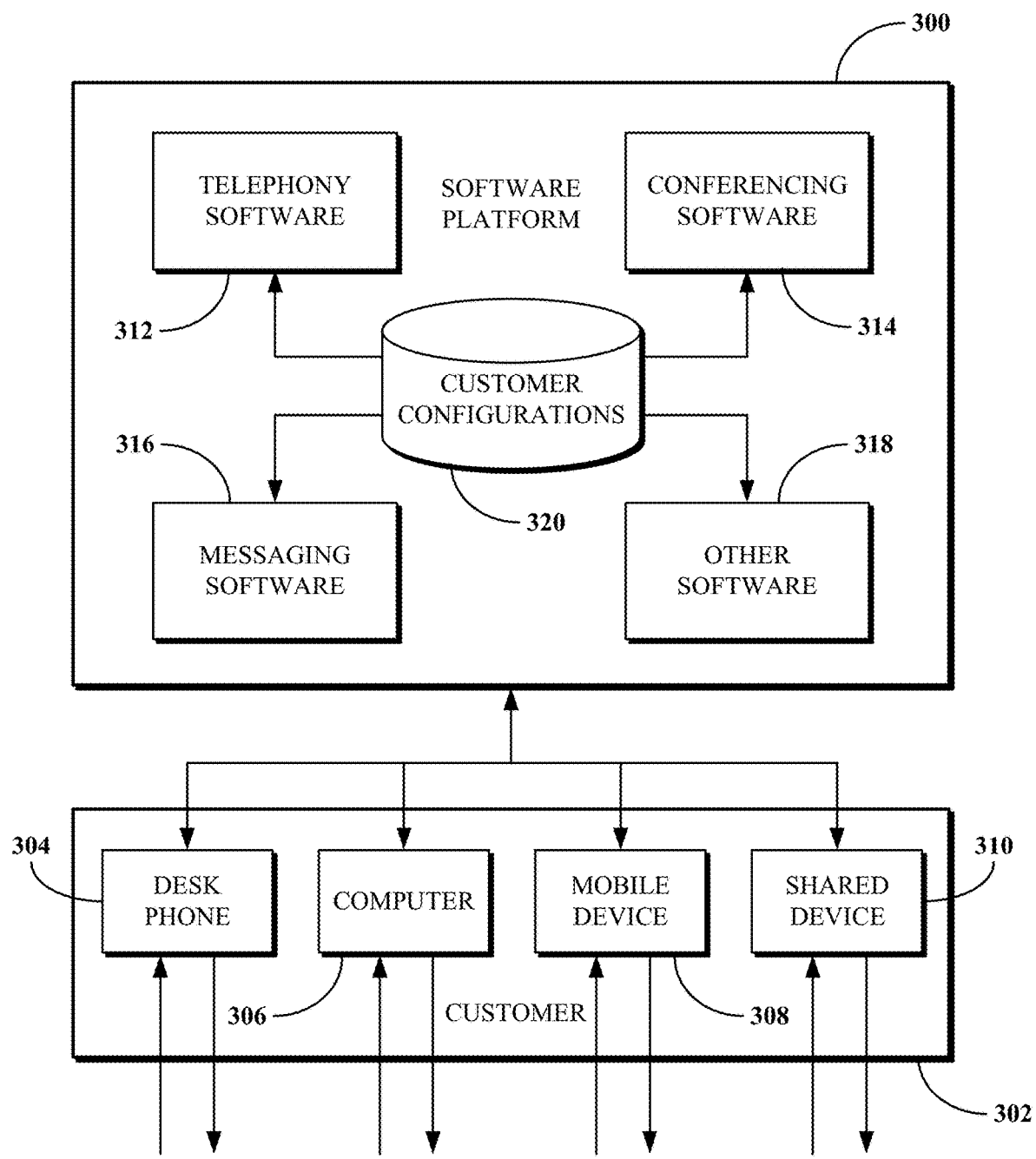
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include virtual background software, for example, for setting the virtual background of a target conference participant using the virtual background of source conference participant or spreading a virtual background to multiple conference participants.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG.

1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
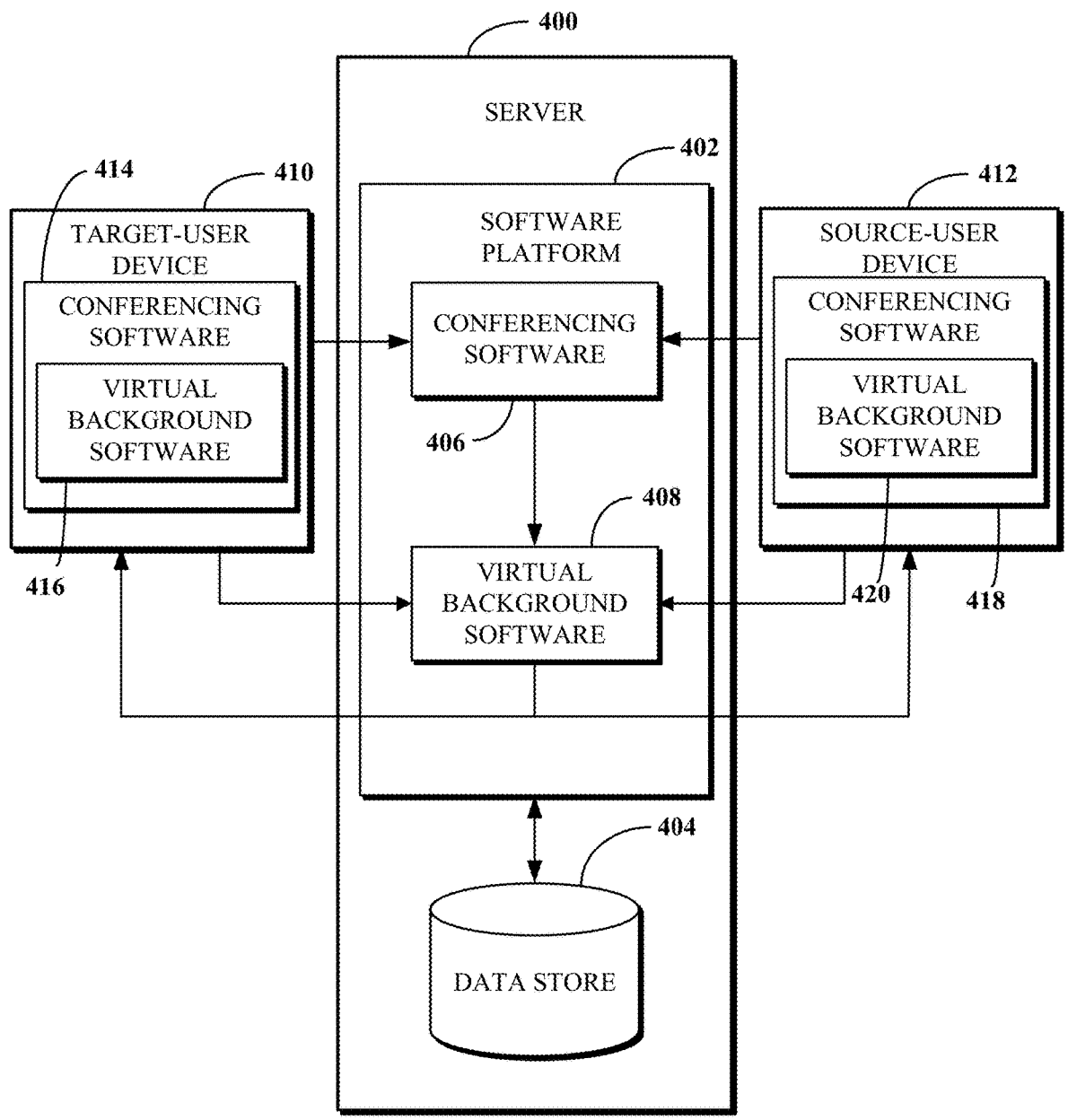
FIG. 4 is block diagrams of an example of a server for virtual background sharing.

FIG. 4 is a block diagram of an example of a server 400 for virtual background sharing. The server 400 enables users to participate in (e.g., virtually join) virtual conferences. In a virtual conference, at least one participant may have their camera enabled. Output images of the at least one participant may be transmitted to at least some of the other participants based on camera images of the at least one participant.

The server 400 may obtain camera images (i.e., images captured by enabled cameras of conference participants) and transmit those camera images (if the user has not selected a VBG) or transmit output images (if the user has selected a VBG) obtained therefrom to the other conference participants. In an example, the server 400 may receive camera images of conference participants and generate output images for transmission to other conference participants. The server 400 may generate an output image of a user based on a VBG selected by the user, based on a VBG selected by another user, or based on a pre-configured VBG.

As shown, two conference participants, using respective user devices (i.e., a target-user device 410 and a source-user device 412) may be participating in a conference. However, as can be appreciated many more user devices may simultaneously connect to a conference. Similarly, a software platform 402 can enable many conferences to be concurrently active. As further described below, the VBG (i.e., the target VBG) of the conference participant of the target-user device 410 may be set based on the VBG (i.e., the source VBG) of the conference participant of the source-user device 412.

A conference participant (e.g., a source conference participant) may set a VBG, which is used to replace the actual background of the user to obtain output images. In an example, and as already mentioned, the server 400 may obtain output images from the device of the conference participant. In another example, as also already mentioned, the server 400 may construct the output images using camera images and the VBG of a conference participant.

Obtaining an output image can include obtaining a segmentation of a camera image into a foreground segment and a background segment. A foreground segment is the set of pixels of the camera image that are determined (e.g., calculated, inferred, or classified) to be foreground pixels. A background segment can be the set of all pixels that are not included in a foreground segment. As already mentioned, the pixels of the foreground segment may not be a connected set of pixels that can be enclosed in a single convex envelop that does not contain non-foreground pixels.

As shown, the server 400 implements or includes the software platform 402 and a data store 404. The server 400 can be one or more servers implemented by or included in a datacenter, such as the datacenter 106 of FIG. 1. The server 400 is shown as including (e.g., running) a conferencing software 406 and a VBG software 408.

The software platform 402 provides conferencing services (e.g., capabilities or functionality) via the conferencing software 406. The software platform 402 can be or can be part of the software platform 300 of FIG. 3. The conferencing software 406 can be variously implemented in connection with the software platform 402. In some implementations, the conferencing software 406 can be included in or can work in conjunction with one or more of the telephony software 312, the messaging software 316, or the other software 318 of FIG. 3. For example, the conferencing software 406 may be or may be integrated within the telephony software 312. In another example, the conferencing software 406 may be or may be integrated within the conferencing software 314.

The VBG software 408 can be used to set or to facilitate the setting of a target VBG of a conference participant based on a source VBG. The source VBG can be the VBG of another conference participant. The source VBG can be selected based on configurations (e.g., rules) for setting VBGs for conference participants. In an example, a VBG software 408 may receive an indication (e.g., a filename, a link, a selection, a file, or image data) of a source VBG or a portion thereof to set the VBG of another conference participant. In another example, one source conference participant may cause the VBG software 408 to set the VBG of one or more other target conference participants using at least a portion of the VBG of the source conference participant.

The data store 404 can store data related to conferences and data related to users, who may have or may participate in conferences. The data store 404 can be included in or implemented by a database server, such as the database server 110 of FIG. 1. The data store 404 can include data related to scheduled or ongoing conferences and data related to users of the software platform 402. For example, the data store 404 can include associations between users and VBGs. As an example, the data store 404 may store, with respect to a user, a preference indicating a particular VBG that is to be used for the user in all conferences that the user participates in. For example, the data store 404 may store an indication of a VBG selected by a user for use during a particular conference. As another example, the data store 404 may store an indication of a VBG that is to be used for, and cannot be changed by, members of a particular group of users. The data store 404 can store other associations between users and VBGs.

The target-user device 410 can be a device of a user who is configured (e.g., enabled) to or otherwise can join a conference. The target-user device 410 may, for example, be one of the clients 304 through 310 of FIG. 3. Alternatively, the target-user device 410 may be a device other than a client device. The target-user device 410 may include a conferencing software 414. The conferencing software 414 can include or work in conjunction with a VBG software 416. The target-user device 410 can include a camera (not shown) that can be configured to capture images of the user while the user is in a conference. At least some of the camera images (or output images obtained therefrom) may be transmitted by the target-user device 410 to the server 400.

In some implementations, the target-user device 410 may communicate directly with the devices of other participants, such as a source-user device 412. The target-user device 410 can directly communicate with the source-user device 412 using peer-to-peer real-time communications. As such, for example, output images obtained at the target-user device 410 can be transmitted directly to the source-user device 412, and vice versa. The source-user device 412 can be similar to the target-user device 410. As such, the source-user device 412 can include a conferencing software 418 that can be similar to the conferencing software 414, and can include a VBG software 420 that can be similar to the VBG software 416. The conferencing software 414 can cause output images to be displayed on a display of the target-user device 410; and the conferencing software 418 can cause output images to be displayed on a display of the source-user device 412.

In an example, the output images may be the same as the camera images. That is, the output images may include the same content as the camera images where the output images and the camera images have the same resolution, bit depth, quality, or other such characteristics. The software platform 402 may receive an indication of a VBG to be used for the conference participant of the target-user device 410. In an example, the indication may be received from the user. For example, the user may select a virtual image from an available catalogue of virtual images; or the user may provide an image file or an image filename that is to be used as the VBG. In the output images, the software platform 402 replaces the actual background of the camera images with a corresponding RBGP, as further described herein.

One or more of the VBG software 408, the VBG software 416, or the VBG software 420 can be used or can interact (e.g., communicate, transmit requests, or receive responses therefor) to set a target VBG at the target-user device 410.

In an example, the VBG software 416 can initiate a request to the VBG software 420 to obtain a source VBG from the source-user device 412. The request may be sent directly from the target-user device 410 to the source-user device 412 or may be sent through the VBG software 408. In another example, the VBG software 416 can obtain and set a target VBG based at least in part on a portion of a source VBG used at the source-user device 412. For example, the VBG software 416 may receive a request from a conference participant of the target-user device 410 to set the target VBG based on an indication of the target conference participant or at least a portion of the source VBG.

In another example, the VBG software 408 can transmit requests (e.g., commands) to one or more conference participant devices to set respective target VBGs. The requests can be based on configurations (e.g., rules) as further described herein. In another example, the VBG software 420 may receive a command to spread a VBG used at the source-user device 412 or a VBG used at another user device to at least a subset of the conference participants.

Figure 5:
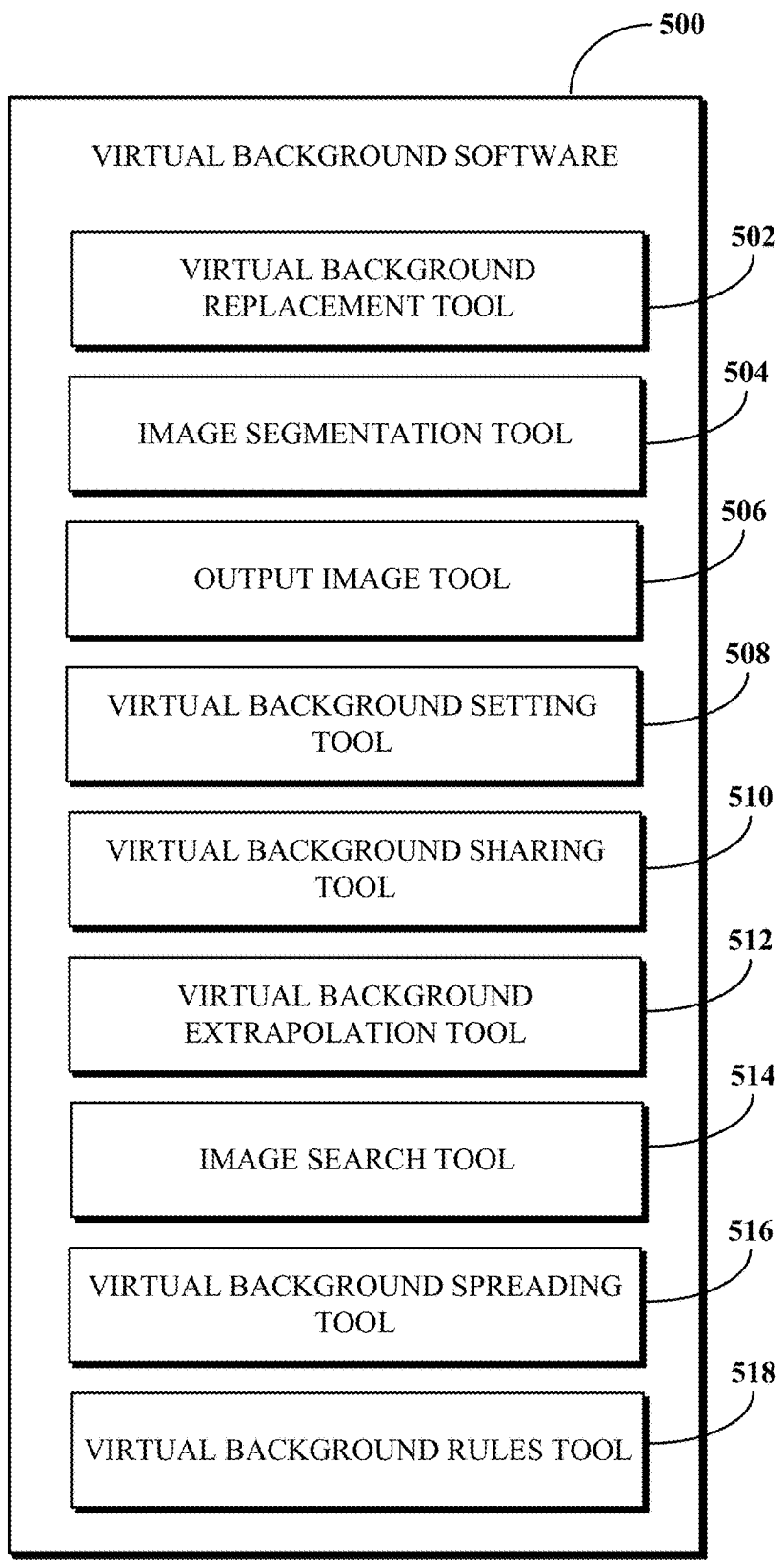
FIG. 5 is a block diagram of example functionality of virtual background software.

FIG. 5 is a block diagram of example functionality of VBG software 500, which may be, for example, one or more of the VBG software 408, the VBG software 416, or the VBG software 420. The VBG software 500 includes tools, such as programs, subprograms, functions, routines, subroutines, operations, executable instructions, and/or the like for, inter alia and as further described below, setting a target VBG of a conference participant based on a source VBG. Setting a target VBG based on a source VBG includes setting the target VBG based on a portion of the source VBG. The source VBG may be the VBG of another conference participant.

At least some of the tools of the VBG software 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the VBG software 500 includes a VBG replacement tool 502, an image segmentation tool 504, an output image generation tool 506, a VBG setting tool 508, a VBG sharing tool 510, a VBG extrapolation tool 512, an image search tool 514, a VBG spreading tool 516, and a VBG rules tool 518. In some implementations, the VBG software 500 can include more or fewer tools. In some implementations, some of the tools may be combined, some of the tools may be split into more tools, or a combination thereof.

The VBG replacement tool 502 can be used to identify a VBG to use for a conference participant. The conference participant may select the VBG for a particular conference. For example, in the process of joining or at any time during the conference, the conference participant may select the VBG. In another example, the conference participant may set a VBG preference such that the VBG that is set as a preference may be, by default, used when the conference participant joins any conference. In yet another example, the employer of the conference participant may have pre-configured (such as via the VBG rules tool 518) one or more VBG preferences and the conference participant can select one of these VBGs. The VBG can be any type of media item, such as a static or a moving image. As such, the VBG can be an image file, a video file, a link to a streamed video, or an animated image (e.g., Graphics Interchange Format (GIF) image).

The image segmentation tool 504 may obtain a segmentation of an image. The image can be a camera image, an output image, or any other image data. The image can be an image that is displayed on an output interface of a computing device 200. For example, an output image of a source target participant may be displayed on a display of a device of the target conference participant, the target conference participant may obtain image data (e.g., a screen capture of the output image or a portion thereof), and a target conference participant may direct the VBG software 500 to set the target VBG based on the image data. In an example, a screen snipping tool may be used to obtain image data of an image that is displayed on an output interface. In an example, the screen snipping tool can be part of the VBG software 500.

Segmenting an image can include obtaining a foreground segment, a background segment, or both from the image. In an example, the image segmentation tool 504 may be or may use a machine learning model that is trained to identify a portrait (e.g., body definition, contour) of a user, who may be facing the camera. In an example, the image segmentation tool 504 may use a service (e.g., a cloud-based service) to obtain the segmentation. In an example, the foreground segment may be an image mask where the pixels of the portrait retain their values from the camera image and all other pixels are set to a certain color value (e.g., black or white) that facilitates image operations (e.g., adding images or replacing an area defined by such pixels with another image portion). In an example, the background segment may be an image mask where the pixels of the portrait are set to the certain value and all other pixels retain their values from the camera image. In an example, an image mask may be a binary image where the pixels of one portion are assigned a first value (e.g., one) and the pixels of the other portion are assigned a second value (e.g., zero).

The output image generation tool 506 obtains an output image that is to be displayed to the other participants. As further described herein, the output image generation tool 506 can obtain a replacement background portion (RBGP) from the VBG based on the segmentation obtained by the image segmentation tool 504.

The tools 508-518 are further described with respect to FIGS. 6A-6E. However, brief descriptions therefor are provided herein. The VBG setting tool 508 enables or facilitates the setting of a target VBG based at least in part on a portion of a source VBG. The VBG sharing tool 510 enables or facilitates the copying (e.g., transferring) of a source VBG to a target-user device so that the copied VBG can be set as a target VBG at the target-user device. The VBG extrapolation tool 512 can be used to substitute (e.g., fill in) a foreground segment of a source VBG with other image data. The image search tool 514 may receive image data (e.g., a VBG, a portion of a VBG, an object name) and obtain matching images therefrom. Similar images can mean or include images that have the same theme as the image data or include objects similar to the image data. The image search tool 514 may use a service (e.g., an internet-based image search service) to obtain the similar image. The VBG spreading tool 516 can be used to cause respective portions of a VBG to be used as VBGs for different conference participants.

The VBG rules tool 518 can be used to pre-configure VBG settings for conference participants. In an example, the VBG rules tool 518 may be configured to use one of a set of pre-configured VBGs for conferences hosted by a particular customer. The VBG rules tool 518 may be configured to spread a VBG (with or without preserving continuity) to all conference participants of a customer. To illustrate, a configuration (e.g., a rule) may indicate that for conferences hosted by the ACME, the VBG titled acme_conference_corporate (which may indicate a filename acme_conference_corporate.jpg) is to be spread to all ACME employees attending the conferences and that continuity of the VBG is to be preserved.

FIGS. 6A-6E illustrate examples of user interfaces (UIs) of a conferencing software, for example, the conferencing software 314 of FIG. 3 or the conferencing software 406 of FIG. 4. The UIs shown in FIGS. 6A-6E illustrate a conference that includes four participants (represented by a participant 602A UI control, a participant 602B UI control, a participant 602C UI control, and a source participant 602D UI control). For brevity and ease of description, statements such as "the participant 602A <verb>" should be understood to mean that the "participant represented by the participant 602A UI control <verb>."

The source participant user 602D has turned on their camera and, as such, output images of the source participant 602D are displayed on respective devices of other participants. That is, the UI control 602D representing the source participant is an output image of the source participant. The UIs of the conferencing software may include a main stage 604 and a participant list 606. The indication (e.g., a UI control, an icon, a label, an output image) of the participant currently speaking may be displayed in the main stage 604 and the non-speaking participants may be listed in the participant list 606.

Figure 6A:
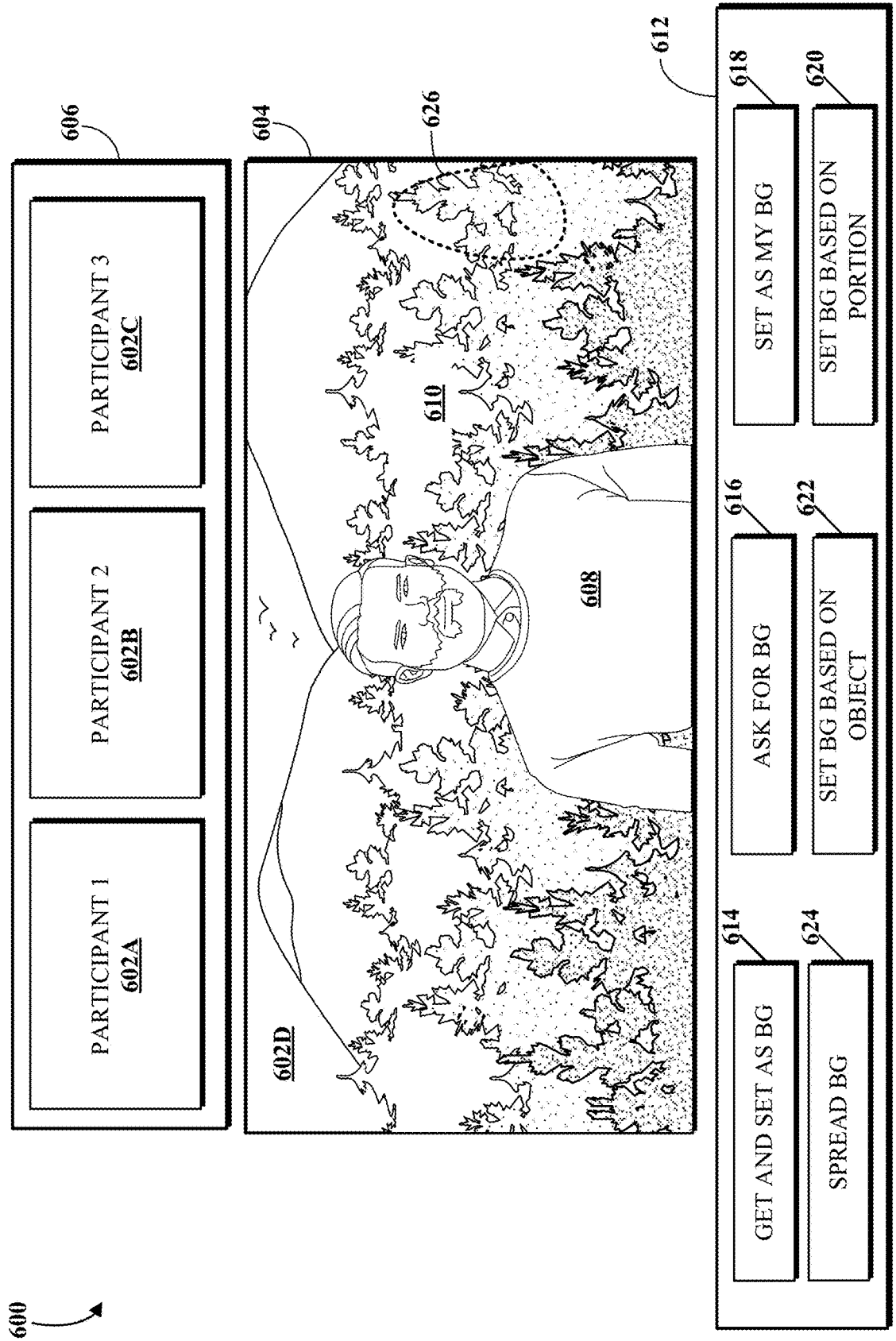
FIGS. 6A-6E illustrate examples of user interfaces of a conferencing software.

A UI 600 of FIG. 6A illustrates that the source participant 602D has selected a VBG, which may be recognized as an image of mountains and a forest. The output image displayed in the main stage 604 now includes the foreground segment 608, which is or includes the portrait (e.g., likeness) of the source participant 602D and an RBGP 610, which replaces the rest of the camera image using the VBG. The output image generation tool 506 obtains the output image, as described above, by combining the foreground segment 608 with the RBGP 610.

While the conference participant that is shown in the main stage 604 is described as the source participant, this disclosure is not so limited and any other conference participant, whether in the main stage 604 or the participant list 606 can be a source participant. Additionally, while the source participant 602D is not listed in the participant list 606, in some implementations, the conference participant shown in the main stage 604 may additionally be included in the participant list 606.

Each of the conference participants may have available commands, such as one or more of the commands 612, for setting a VBG for the conference participant or for other conference participants. The commands 612 is shown as including the commands 614-624. However, more or fewer commands may be available. The VBG software 416 of the target-user device 410 may cause the commands 612 to be presented on a display of the target conference participant. The commands 612 may be presented in any number of ways and may be presented using different user control elements (e.g., buttons or menu items). A respective user flow may be associated with each of the commands 612 for an optimal user experience.

In an example, the commands 612 may be available via a pop-up menu, which may be presented to the conference participant in response to, for example, a mouse click. To illustrate, the participant 602A may click a right mouse button over the participant 602B, which in turn causes to be presented at least a subset of the commands 612 to the participant 602A; or the participant 602C may click a right mouse button over the source participant 602D, which in turn causes to be presented at least a subset of the commands 612 to the participant 602C. Some of the commands may be enabled or disabled based on context. To illustrate, the commands 614-616 may not be enabled or available if a conference participant clicks the right mouse button over the interface control representing himself or herself.

Figure 6B:
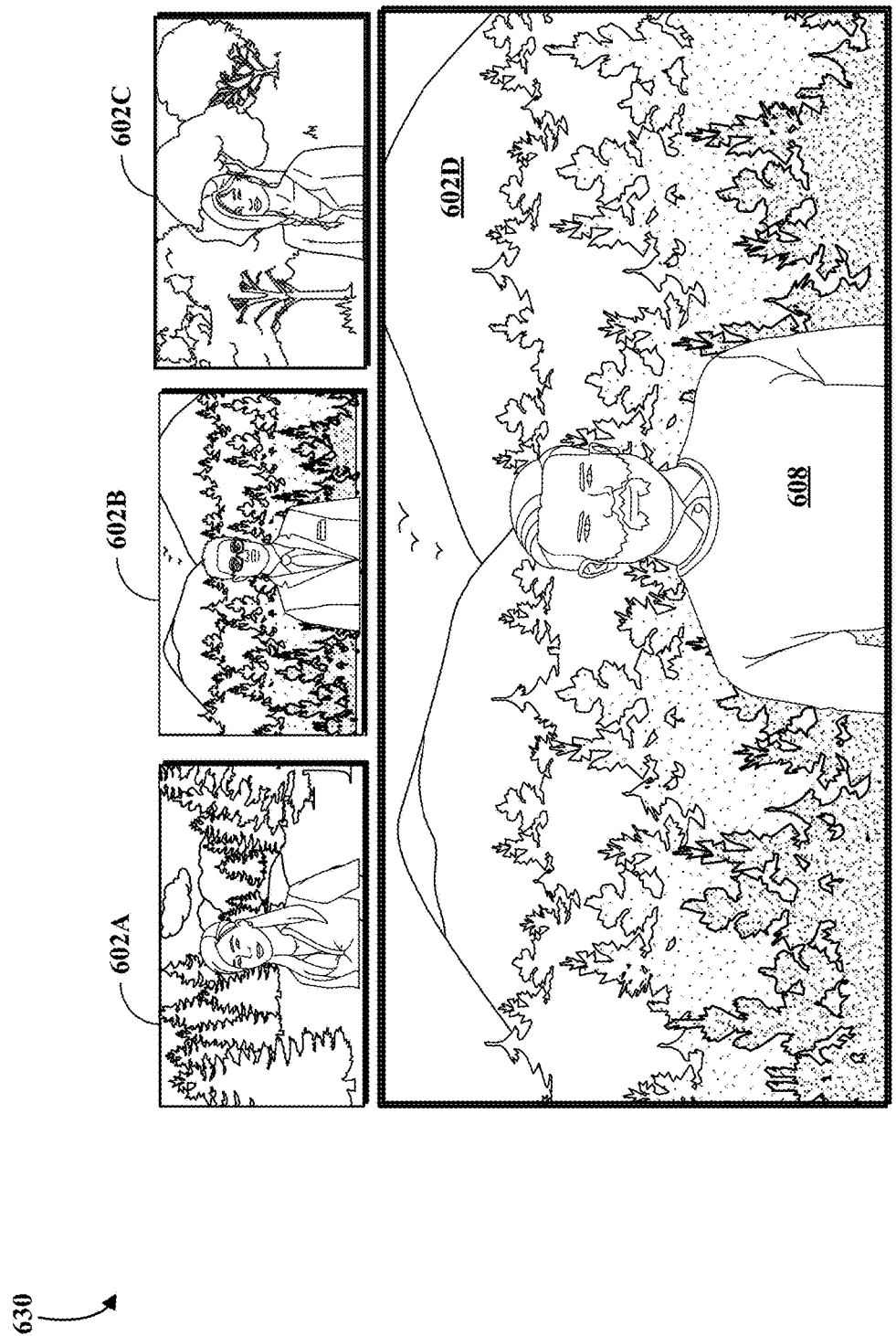

A UI 630 of FIG. 6B illustrates results of target participants invoking commands of the commands 612. In the description below, each of the commands 614-622 is assumed to be selected at a target-user device, such as the target-user device 410, to set a VBG based on the VBG of a source-user device, such as the source-user device 412 of FIG. 4.

The command 614 (labeled "GET AND SET AS BG"), when executed, causes the VBG sharing tool 510 of the target-user device 410 to obtain the VBG used at the source-user device 412. The VBG sharing tool 510 may transmit a request to be received by the VBG software 420. The VBG software 420 identifies a location (e.g., a folder location, a network location) of the VBG. The VBG software 420 transfers the VBG to the VBG sharing tool 510. The VBG sharing tool 510 can save the VBG to a folder location of the target-user device. The folder location may be a location that software 414 is configured to use as a library of VBGs. The VBG setting tool 508 can then set the VBG of the target-user device to the newly acquired VBG (i.e., the VBG of the source user device 412). In an example, the request may be transmitted from the target-user device 410 to the VBG software 408. In a case that the VBG used at the source-user device 412 is known to the VBG software 408 and is located at the server 400, then the VBG software 408 may transfer the source VBG to the target-user device 410. In a case that the VBG is not known to the VBG software 408, then the request is transmitted to the VBG software 420. In the case that the source VBG is a streaming media item, transferring the VBG can include transmitting a location from which the source VBG is streamed, which may include an indication (e.g., a stream identifier) of the stream itself.

In an example, the VBG software 420 does not transfer the source VBG to the VBG software 416 unless the source conference participant grants the request. In response to receiving the request, the VBG software 420 may present a prompt, such as a prompt 650 of FIG. 6C, to the source conference participant. The prompt 650 indicates that the target conference participant is requesting the VBG of the source conference participant. The prompt may include details of the VBG. The details may include a location of the VBG, a filename (e.g., MY_VBG10.JPG), or other details.

The VBG software 420 transfers the VBG in response to the source conference participant granting the request, such as by selecting an option 652 of the prompt 650. The VBG software 420 does not transfer the VBG in response to the source conference participant denying the request, such as by selecting an option 654 of the prompt 650. In an example, the prompt may be displayed in a chat session. To illustrate, the VBG software 420 may initiate a chat session with the source conference participant where the VBG software 420 causes to be displayed a message such as "PARTICIPANT 602C is requesting your virtual background file my_vbg10.jpg. Enter YES to send it; anything else to not send it."

The command 616 (labeled "ASK FOR BG"), when executed, causes the VBG sharing tool 510 to request the VBG of the source conference participant. The command 616, when executed, causes actions similar to the command 614 to be performed with the exception that the command 616 does not cause the VBG of the target conference participant to be set based on the VBG. That is, the command 616 may receive the VBG but does not cause the VBG setting tool 508 to set the VBG of the target conference participant using the received source VBG.

The command 618 (labeled "SET AS MY BG"), when executed, causes the VBG setting tool 508 to set the VBG of the target conference participant based on the output image of the source conference participant that is displayed on the target device. As mentioned above, the output image of the source conference participant includes (e.g., is assembled using) a foreground segment that includes the likeness of the source conference participant and an RBGP that is obtained from a VBG. The VBG setting tool 508 can cause the image segmentation tool 504 to obtain a segmentation of the output image that includes a source foreground segment and a source background segment. In an example, a request for the output image is transmitted from the VBG setting tool 508 of the target device to the VBG software 420 of the source device. In response to the request, the VBG software 420 transfers the output image to the VBG setting tool 508. In another example, the VBG setting tool 508 can use an image snipping tool to obtain image data of the output image as displayed on the target-user device 410.

Figure 6C:
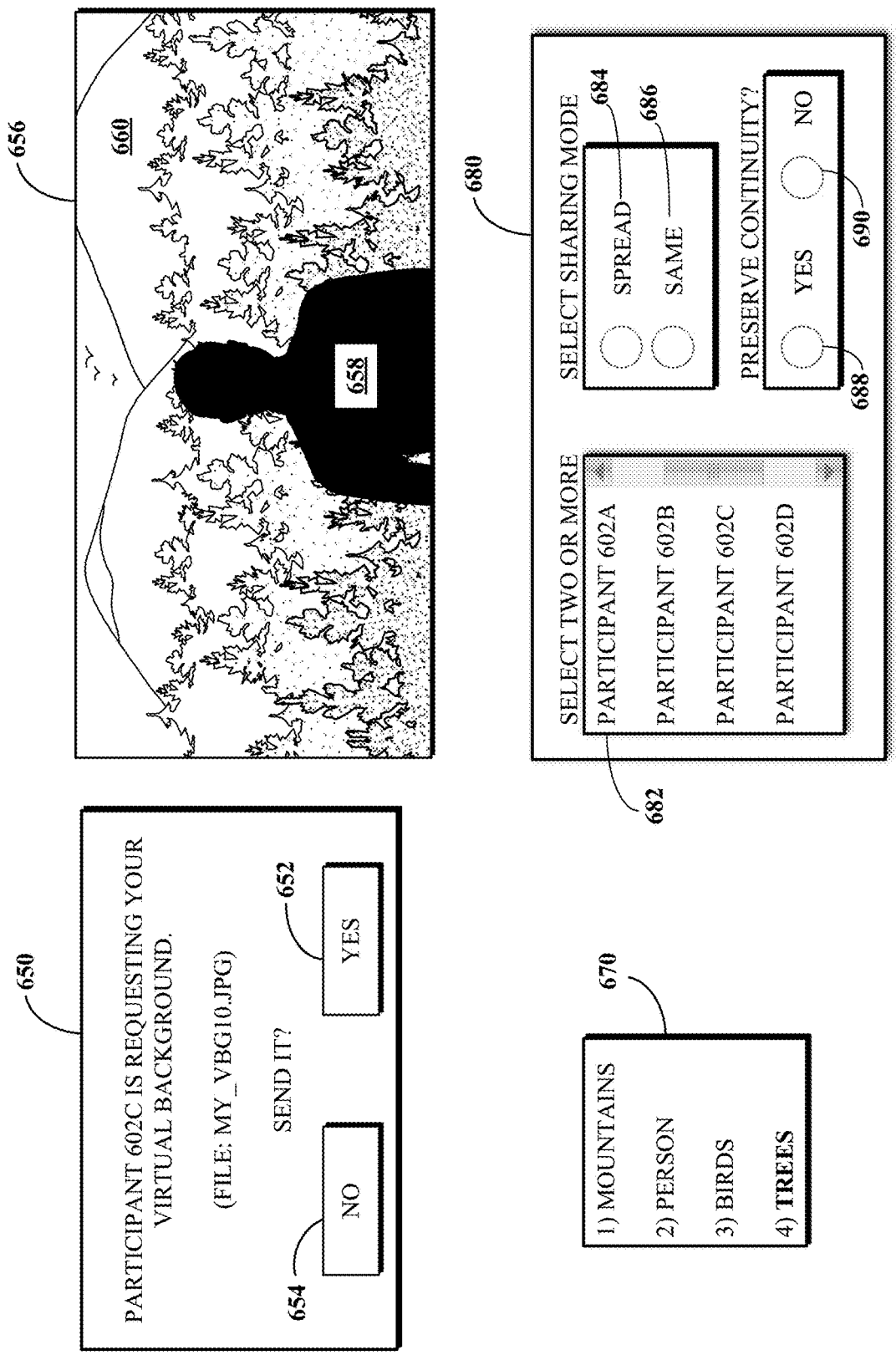

In an example, the target VBG can be an image where the source foreground segment is replaced by pixel values having a particular value (e.g., 0 corresponding to the color black, 1 corresponding to the color white, or a value in between corresponding to a different color). FIG. 6C illustrates obtaining a target VBG 656 from the output image displayed in the main stage 604 of FIG. 6A. The target VBG 656 includes a source background segment 660 obtained from the output image and a mask 658 corresponding to the source foreground segment of the output image. The image segmentation tool 504 can be used to obtain the target VBG 656 from the output image displayed in the main stage 604.

To obtain output images of the target conference participant, the output image generation tool 506 combines (e.g., overlays) a foreground segment of the target conference participant with the mask 658. As described above, the foreground segment can be obtained from camera images of the target conference participant. The VBG setting tool 508 may scale (e.g., resize) the foreground segment of the target conference participant so that the mask 658 is covered. Alternatively, the VBG setting tool 508 may scale the target VBG so that the mask 658 is covered by the foreground segment of the target conference participant.

In an example, the VBG extrapolation tool 512 may be used to complete the target VBG 656 so that it does not include the mask 658. That is, the VBG extrapolation tool 512 can replace the mask 658 with image data that is based on the source background segment 660. Any image inpainting technique known in the art can be used. In an example, a machine learning (ML) model can be used to fill in the mask 658 based on the source background segment 660. In an example, the ML model can be a Generative Adversarial Network (GAN) that is trained to complete images that include missing patches. In an example, the GAN can be a Wasserstein GAN that creates coarse patches for filling missing regions in images. An obtained patched image can be further processed (such as by applying one or more deblocking filters, smoothing filters, or blending filters) to remove or smooth discontinuities between the added patches and the source background segment 660.

The command 620 (labeled "SET BG BASED ON PORTION"), when executed, enables the target conference participant to use a pointing device (e.g., a mouse pointer, a stylus) to select an object in or a portion of an output image. As an example, the user may click (using the pointing device) on a location of the output image (i.e., an image location). An object recognition tool can identify an object of the output image that includes the image location. The object recognition tool can receive the image location (e.g., a pixel location or a cartesian coordinate in the image) and identify the object that contains the image location. As another example, the UI 600 of FIG. 6A illustrates that the target conference participant has drawn a free-form box 626 around an area of the output image.

In response to the user completing the free-form box 626 or the object being recognized, the image search tool 514 can be used to perform an image search based on a description of the object (e.g., "TREE" in this example) or image data included in the area in the output image. In an example, the results of the image search may be displayed to the target conference participant who can select one of the images that the VBG setting tool 508 can then use to set the target VBG. In an example, the VBG setting tool 508 may warn the target conference participant that the selected image may be subject to rights of others and may not be freely used. The image search may obtain images having a same theme as the portion or object of the output image. In an example, the target conference participant may configure the image search to obtain images having the same theme. For example, a UI form (not shown) may enable the user to specify configurations of the image search.

The command 622 (labeled "SET BG BASED ON OBJECT"), when executed, causes an object recognition tool to obtain and cause a list of objects detected (e.g., identified or recognized) in the output image, such as a list 670 of FIG. 6C, to be presented to the target conference participant. The object recognition tool can be used to obtain a list of identified objects in a camera image. To illustrate, the list 670 may include the objects MOUNTAINS, PERSON, BIRDS, TREES detected in the output image. In an example, the list 670 may include objects detected in only the background segment of the output image.

The object recognition tool can be the image search tool 514 or another tool of VBG software 500. The object recognition tool can be, use, or include a machine learning model for object detection that is trained to identify objects in images. In an example, the list of objects may be textually presented to the user, such as in an alphabetical list. In another example, the list of objects may be additionally, or alternatively, presented graphically. For example, each object may be surrounded by a bounding box and associated with a label describing the object.

The target conference participant can select one or more objects from the list and an image search can be performed based on the selected object(s). The VBG setting tool 508 can set the target VBG based on an image selected by the target conference participant from the image search results.

Returning briefly to FIG. 6B, the UI 630 illustrates that the participant 602A used the command 620 to set a target VBG having a same theme (e.g., mountains and trees) as the source VBG of the source participant 602D; that the participant 602B may have used one of the commands 614 or 618 to set a target VBG to the VBG of the source participant 602D; and that the participant 602C used the command 620 or the command 622 to set a target VBG that is based on the identified tree object of the output image of the source participant 602D.

Returning again to FIG. 6A, the command 624 (labeled "SPREAD BG"), when executed, can cause the VBG of a source target participant to be used to set the VBG for at least some of the conference participants. The at least some of the conference participants can include the source target participant. In some examples, the command 624 may only be available to a subset of the conference participants. For example, the command 624 may be available to a host of the conference. In another example, the command 624 may be available to participants configured to be able to execute the command 624.

In response to a conference participant (i.e., an invoking conference participant) invoking the command 624, the VBG spreading tool 516 may present or cause to be presented to the conference participant a user interface, such as a UI 680 of FIG. 6C, that the invoking conference participant can use to configure to whom a selected source VBG is to be spread and properties of the spreading.

The UI 680 of FIG. 6C includes a participants list 682 from which the invoking conference participant can select the subset of the conferences participants whose VBGs are to be set based on the source VBG.

By selecting a mode 684 (i.e., "SPREAD"), the invoking conference participant can indicate that the source VBG is to be partitioned into sections corresponding to the number of selected conference participants of the participants list 682. The VBG of each of the selected conference participants is set based on one of the portions. By selecting a mode 686 (i.e., "SAME"), the invoking conference participant can indicate that the respective target VBG of each of the selected conference participants is to be set to the same source VBG.

Each of the VBG software 500 of the devices of the selected conference participants from the participant list 682 may receive the source VBG. For example, the VBG sharing tool 510 of the device using the source VBG may be directed to transfer, and each of the VBG sharing tool 510 of the selected conference participants may be directed to receive, the source VBG. It is noted that the source VBG can be a patched image, as described above with respect to the VBG extrapolation tool 512.

In an example, the VBG software 408 may indicate to the target-user devices of the selected conference participants which respective portions of the source VBG are to be used as the respective target VBGs. For example, the VBG software 408 can indicate that the source VBG is to be partitioned into portions corresponding to the number of selected conference participants and according to an arrangement. The VBG software 408 can select the arrangement so that each of the portions corresponds to an aspect ratio that minimally distorts (if at all) the portions. To illustrate, assume that the number of selected conference participants is 10, then the arrangement may be indicated as a 5×2 grid (i.e., a partitioning of the source VBG into 2 columns and 5 rows), as a 2×5 grid (a partitioning of the source VBG into 5 columns and 2 rows), as 4-3-3 grid (a partitioning of the source VBG into 3 rows, where the first row includes 4 portions, the second row includes 3 portions, and the third row includes 3 portions).

Figure 6D:
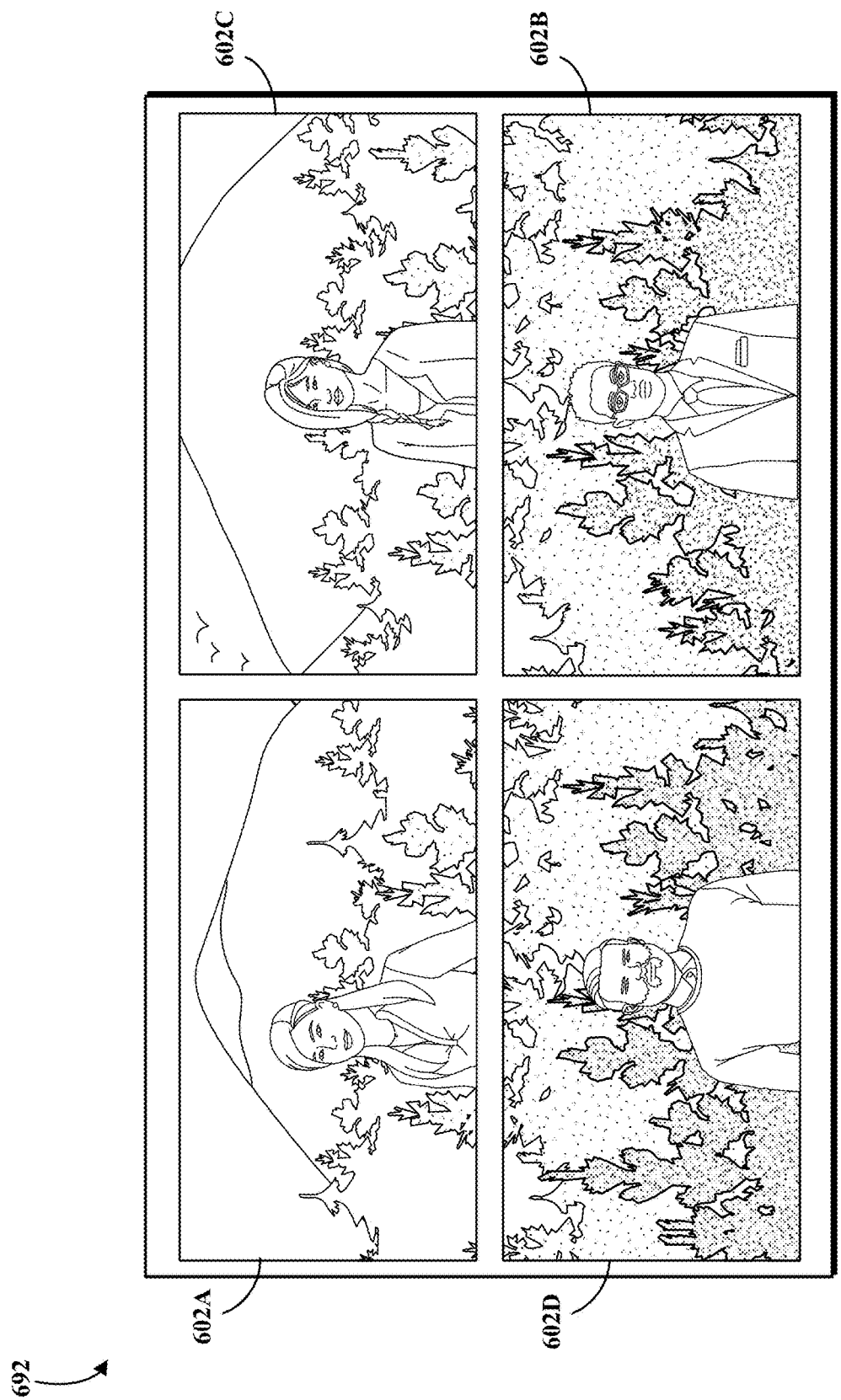
Figure 6E:
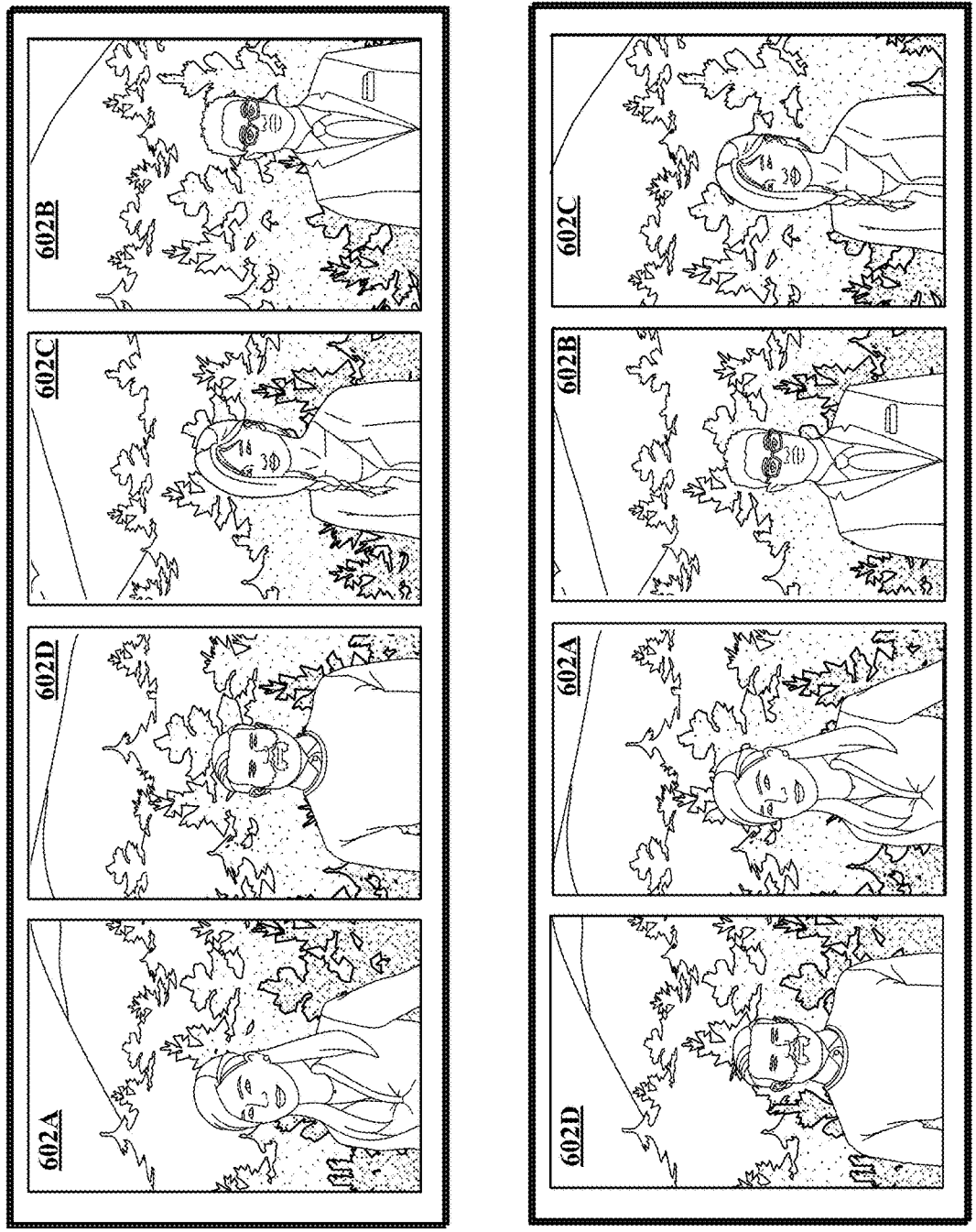

FIG. 6D illustrates an example 692, where the conference participants are arranged in a 2×2 grid. As such, the source VBG is partitioned into 4 quadrants where each quadrant is used as a VBG for one of the conference participants. An example 694 of FIG. 6E illustrates that the conference participants are arranged in a 1×4 grid. As such, the source VBG is partitioned into 4 contiguous portions where each portion is used as a VBG for one of the conference participants.

In some examples, a conferencing software may allow a conference participant to arrange the conference participants in an arrangement convenient to the conference participant. To illustrate, one conference participant may select a 2-column arrangement that may be displayed on a right-side of a display while another conference participant may arrange the conference participants in a 1-row arrangement that may be displayed along a top edge of the display. Additionally, one conference participant may arrange the conference participants in one order while another conference participant may select another order.

In some situations, it may be desirable to maintain the continuity of the portions regardless of the arrangement of the selected conference participants. As such, in the UI 680, the invoking conference participant can select whether the continuity of the image portions should be preserved (by selecting an option 688) or not (by selecting an option 690).

When continuity of the image portions is to be preserved, then the foreground segments of the selected conference participants and the image portions may not be combined at the devices of the selected conference participants. This is so because different output images (i.e., output images showing different RBGPs) of one conference participant may need to be presented for (e.g., at the devices of) different conference participants. Alternatively, the conferencing software executing at a device of a selected conference participant may transmit an image mask that includes only the foreground segment of a camera image. In an example, the image mask may be transmitted in addition to an output image. The VBG spreading tool 516 of a conference participant may combine the image mask with the appropriate image portion to obtain an output image. In yet another alternative, the VBG spreading tool 516 of the VBG software 408 may combine the image mask with the appropriate image portion to obtain an output image and transmit the output image to the conferencing software of a conference participant.

The UI 692 of FIG. 6D, described above, illustrates a 2×2 arrangement of the conference participants of FIG. 6A at the display of a first conference participant where the VBG is spread across the conference participants. The UI 694 of FIG. 6E illustrates a 1×4 arrangement of the conference participants of FIG. 6A at the display of a second conference participant where the VBG is spread across the conference participants. In the UI 694 the conference participants are arranged from left-to-right in the order of the participant 602A, the participant 602D, the participant 602C, and the participant 602B. Contrastingly, a UI 696 of FIG. 6E illustrates a 1×4 arrangement of the conference participants of FIG. 6A at the display of a third conference participant where the VBG is spread across the conference participants and where the conference participants are arranged from left-to-right in the order of the participant 602D, the participant 602A, the participant 602B, and the participant 602C. As can be seen, even though the arrangements of the conference participants in the UIs 694 and 696 are different, the continuity of the source VBG that is spread across the conference participants can still be observed.

Figure 7:
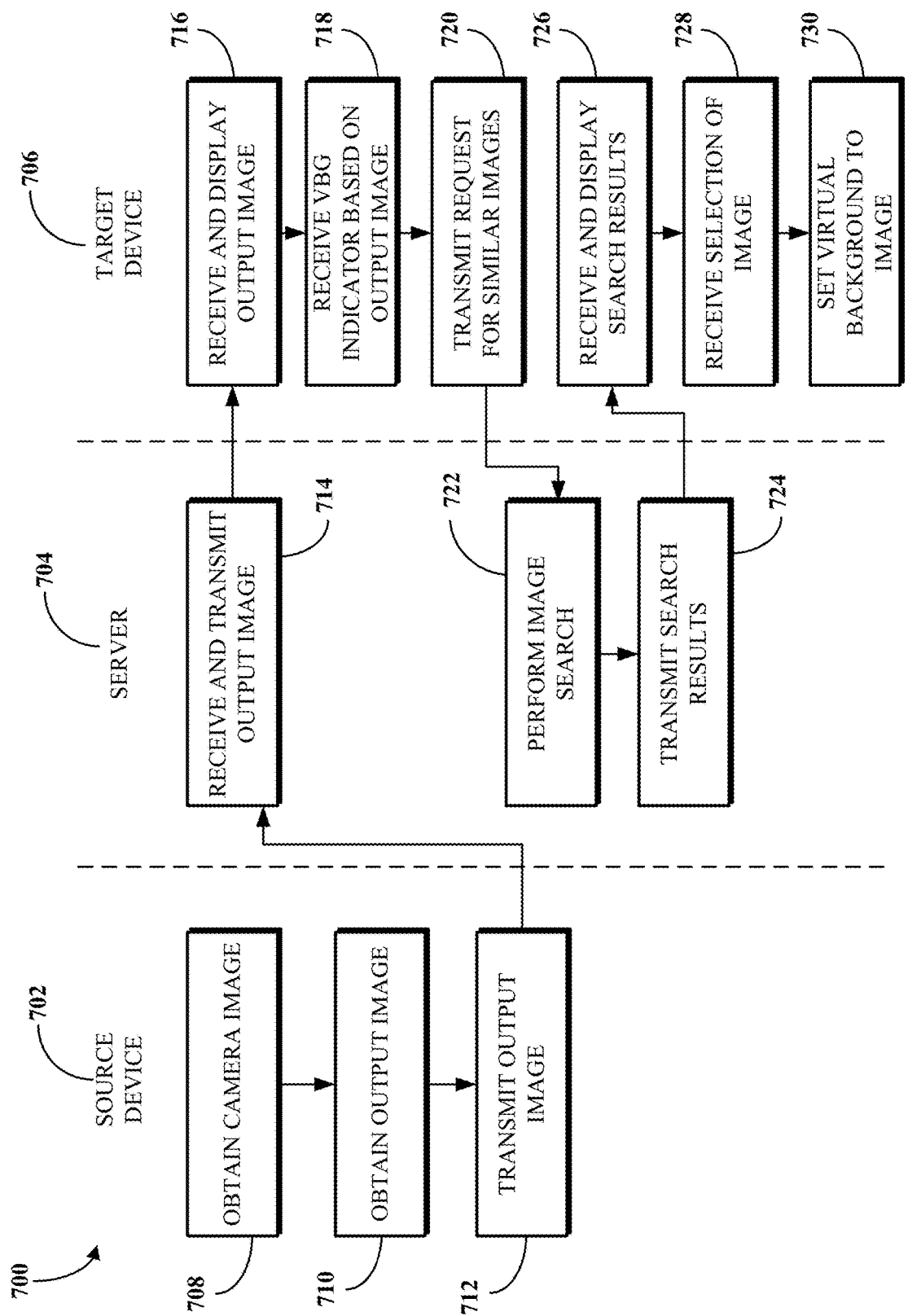
FIG. 7 is an example of an interaction diagram for setting a virtual background at a target device.

FIG. 7 is an example of an interaction diagram 700 for setting a virtual background at a target device. The interaction diagram 700 illustrates that two participants using respective participant devices, a source device 702 and a target device 706, are current participants of a conference hosted by a server 704, which includes a conferencing software platform, such as the software platform 300 of FIG. 3 or the software platform 402 of FIG. 4. The source device 702 can be the source-user device 412 of FIG. 4. The target device 706 can be the target-user device 410 of FIG. 4. While not specifically shown in the interaction diagram 700, a conferencing software of the source device 702 is configured to use a source VBG. Additionally, the source device 702 and the target device 706 each includes a camera that can be used to obtain camera images for use by the conferencing software.

At 708, a camera image is obtained by a conferencing software of the source device 702. At 710, an output image is obtained from the camera image. As mentioned, the output image is such that a background segment of the camera image is replaced by a RBGP from the source VBG. At 712, the output image is transmitted to the server 704. At 714, the server 704 receives the output image and transmits it to the target device 706. The server 704 may also receive output images from devices of other conference participants, which may include the conference participant of the source device 702, and transmits the output images to other conference participants.

At 716, the conferencing software of the target device 706 receives the output image and displays it on a display of the target device 706. At 718, the VBG software of the target device 706 receives a VBG indicator that is based on the output image. The VBG indicator can be image data that is a capture of at least a portion of the output image as displayed on the display of the target device 706. The VBG indicator can be an indicator of an object included in the output image. The VBG indicator can be an indicator of the output image itself. The conferencing software may temporarily store output images that are received. As such, a temporarily stored output image may be used instead of obtaining an image clipping from the displayed output image.

At 720, the target device 706 transmits a request to the server 704 to obtain images similar to the VBG indicator. At 722, the target device 706 performs an image search to obtain image search results that match the VBG indicator. For example, an image search tool of the server 704 may perform the search. At 724, at least a portion of the image search results are transmitted to the target device 706. At 726, the VBG software of the target device 706 receives and displays the image search results at the target device 706. At 728, the VBG software of the target device 706 receives, such as from the target user, a selection of one of the images. At 730, the VBG software of the target device 706 sets the VBG of the target participant to the selected image. In some implementations, the image search at 722 may be performed at the target device 706 instead of the server 704 and the transmitting the search results at 724 is not performed.

Figure 8A:
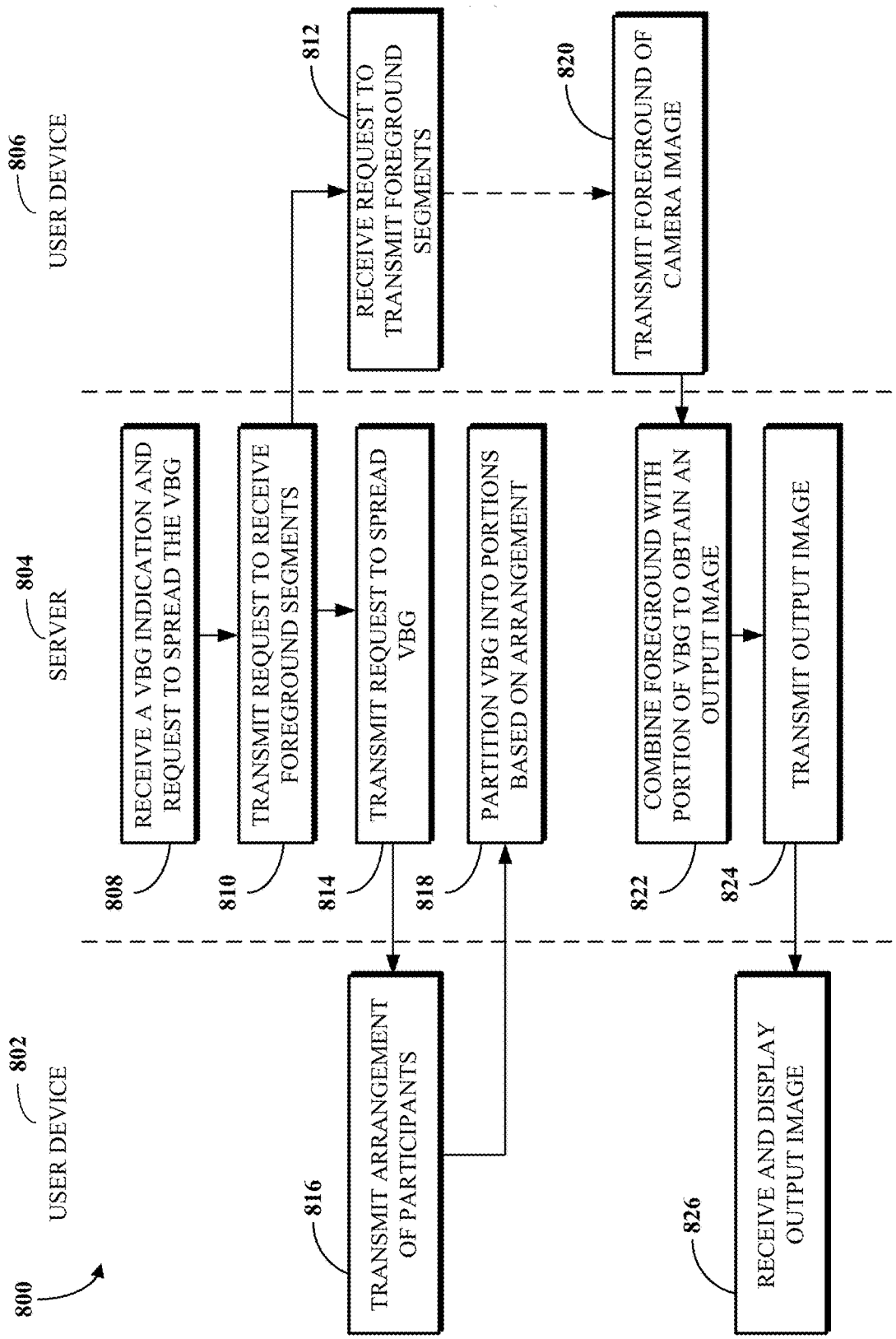
FIG. 8A is an example of an interaction diagram for spreading a virtual background.

FIG. 8A is an example of an interaction diagram 800 for spreading a virtual background. The interaction diagram 800 illustrates that two participants using respective participant devices, a user device 802 and a user device 806, are current participants of a conference hosted by a server 804, which includes a conferencing software platform, such as the software platform 300 of FIG. 3 or the software platform 402 of FIG. 4. The user device 802 can be the source-user device 412 or the target-user device 410 of FIG. 4. Similarly, the user device 806 can be the source-user device 412 or the target-user device 410 of FIG. 4. The user device 802 and the user device 806 can each include a camera that can be used to obtain camera images for use by the conferencing software.

The interaction diagram 800 describes an implementation of VBG spreading where selected participants, which may be selected as described with respect to participants list 682 of FIG. 6C, include the conference participant using the user device 806. As such, the likeness of the conference participant of the user device 806 is to be overlaid on at least a portion of a VBG. The interaction diagram 800 illustrates the case where continuity of the VBG is preserved regardless of the arrangement of the conference participants at any particular user device, such as the user device 802.

At 808, a VBG software of the server 804 receives a VBG indication and a request to spread the VBG that is obtained based on the indication. The VBG indication can be obtained such as described with the command 624 of FIG. 6A. The request may be received from the user device 802, the user device 806, some other user device, or based on a rule configured using the VBG rules tool 518 of the server 804.

At 810, the server 804 transmits requests to user devices (such as the user device 806) of conference participants selected for VBG spreading to receive foregrounds segments from these user devices. That is, the server 804 transmits the request to user devices of the conference participants selected as described with respect to participant list 682 of FIG. 6C. At 812, the request is to transmit foreground segments is received at the user device 806.

At 814, requests to receive respective arrangements of the conference participants at user devices of the conference participants are transmitted to the user devices (such as the user device 802). In an example, the requests are transmitted only to user devices that are capable of graphically displaying the conference participants. At 816, the VBG spreading tool of the user device 802 may transmit the arrangement of the conference participants at the user device 802 to the server 804. In an example, the arrangement can be transmitted as a one-, two-, or three-dimensional data structure that describes positions of conference participants as arranged at the user device 802. A three-dimensional data structure includes depth data, such as in a case where the conference participants are arranged in rows such as in a hall or a classroom. The data structure can include identifiers of the conference participants.

At 818, in response to receiving an arrangement from a user device, a partitioning of the VBG corresponding to the received arrangement is obtained. The partitioning can be associated with the user device from which it is received. As such, different partitionings can be obtained for the VBG. While not specifically shown in FIG. 8A, if the arrangement is changed at a user device, then the VBG spreading tool of that user device can transmit a new arrangement to the server 804, which then obtains a new partitioning of the VBG according to the new arrangement. Similarly, a new partitioning of the VBG can be obtained when the number of participants changes (such as when a participant leaves the conference, or a participant joins the conference).

At 820, the user device 806 transmits foreground segments of camera images to the server 804. At 822, the VBG spreading tool of the server 804 obtains an output image by combining a received foreground segment with the portion of the VBG that corresponds to the conference participant of the user device 806 and based on the arrangement received from the user device 802. As such, at 822, the server can obtain specific output images for the different user devices that are to receive output images. At 824, the output image is transmitted to the user device 802. At 826, the output image is received and displayed on a display of the user device 802.

In some implementations, the interaction diagram may not include the steps 810 and 812. In such a case, the user device 806 transmits output images at 820 (instead of only the foreground segments); and the server 804 performs a step of segmenting an output image received from the user device 806 to obtain the foreground segment, which is then input to the step 822.

Figure 8B:
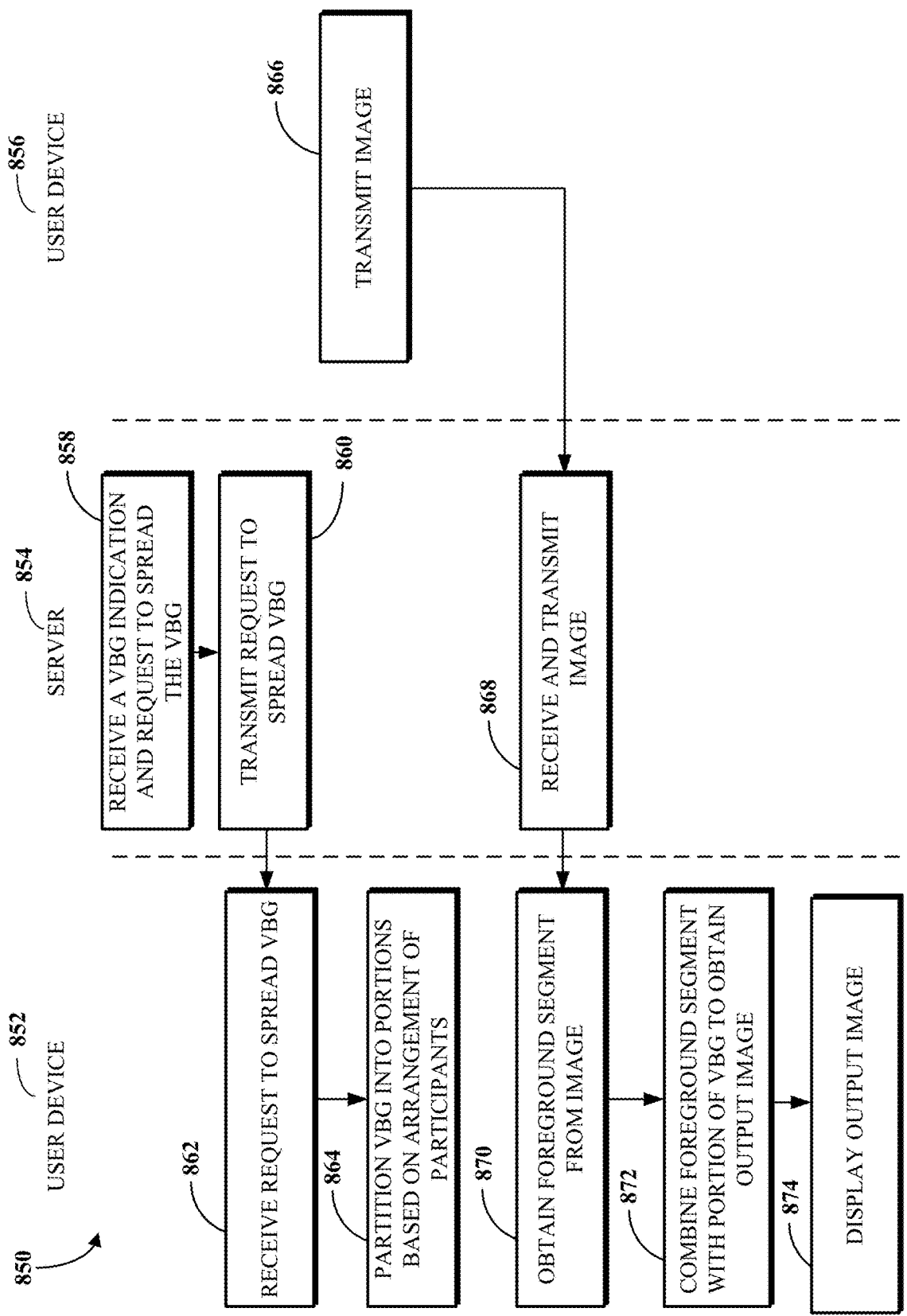
FIG. 8B is an example of another interaction diagram for spreading a virtual background.

FIG. 8B is an example of another interaction diagram 850 for spreading a virtual background. The interaction diagram 850 illustrates that two participants using respective participant devices, a user device 852 and a user device 856, are current participants of a conference hosted by a server 854, which includes a conferencing software platform, such as the software platform 300 of FIG. 3 or the software platform 402 of FIG. 4. The user device 852 can be the source-user device 412 or the target-user device 410 of FIG. 4. Similarly, the user device 856 can be source-user device 412 or the target-user device 410 of FIG. 4. The user device 852 and the user device 856 each includes a camera that can be used to obtain camera images for use by the conferencing software. As compared to the interaction diagram 800, the interaction diagram 850 is such that the portions of a VBG to be spread are combined with foreground segments of images of conference participants at user devices rather than at the server (and, thus, the order of the participants can be rearranged at a user device and continuity of the spread virtual background can be maintained).

Similar to the interaction diagram 800 of FIG. 8A, the interaction diagram 850 describes an implementation of VBG spreading where selected participants, which may be selected as described with respect to participants list 682 of FIG. 6C, include the conference participant using the user device 806. As such, the likeness of the conference participant of the user device 806 is to be overlaid on at least a portion of a VBG. The interaction diagram 850 illustrates the case where continuity of the VBG is preserved regardless of the arrangement of the conference participants at any particular user device, such as the user device 852.

At 858, which can be similar to 808 of FIG. 8A, a VBG software of the server 854 receives a VBG indication and a request to spread the VBG that is obtained based on the indication. At 860, the server 854 transmits requests to user devices (such as the user device 852) of conference participants selected for VBG spreading to receive foregrounds segments from these user devices. The requests can include the selected participants to whom the VBG is to be spread. At 862, the user device 852 receives the request to spread the VBG. At 864, responsive to the request, the VBG is partitioned into portions based on an arrangement of the conference participants at the user device 852. While not specifically shown in the interaction diagram 850, a new partitioning of the VBG can be obtained when the arrangement of the participants changes or when the number of participants changes (such as when a participant leaves the conference, or a participant joins the conference).

At 866, the user device 856 transmits an image to the server 854. The image may be a camera image or an output image, depending on whether the conference participant of the user device 856 has set a VBG. At 868, the server 854 receives the image from the user device 856 and transmits the image to the user device 852. At 870, a foreground segment is obtained from the image. For example, an image segmentation tool may be used to obtain the foreground segment. At 872, the foreground segment is combined with the portion of the VBG that corresponds to the conference participant of the image to obtain an output image. At 874, the output image can be displayed on a display of the user device 852.

Figure 9:
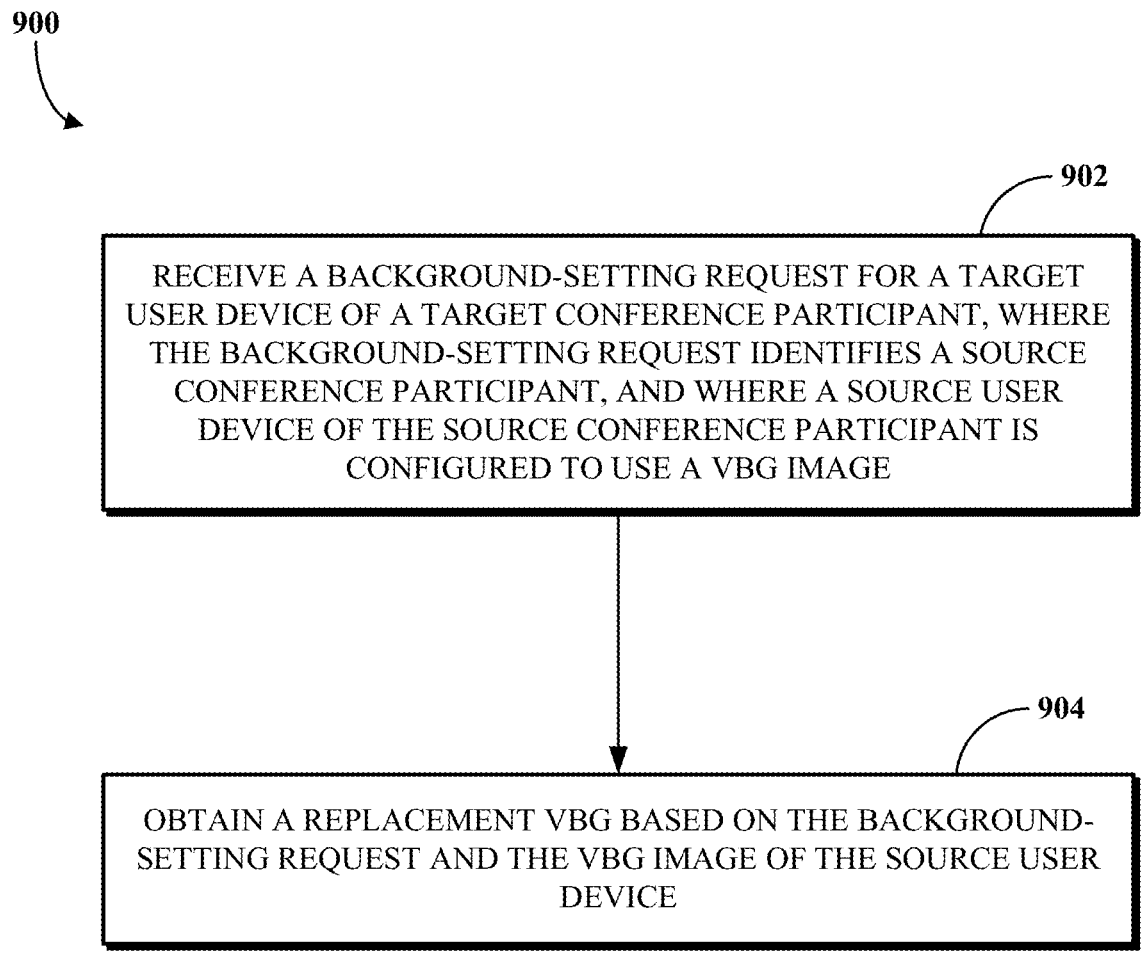
FIG. 9 is a flowchart of an example of a technique for setting a virtual background of a target device based on the virtual background of a source device.

To further describe some implementations in greater detail, reference is next made to examples of techniques which may be performed for or using virtual background sharing. FIG. 9 is a flowchart of an example of a technique 900 for setting a VBG of a target device based on the VBG of a source device. The technique 900 can be executed using computing devices, such as the systems, hardware, and software described with respect to FIGS. 1-8B.

The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof or may be in the form of a non-transitory computer readable medium storing instructions executable by one or more processors to perform the technique. The technique 900 can be implemented in whole or in part by a VBG software, such as the VBG software 500 of FIG. 5. The VBG software may be available or executing at a target user device or a server device.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a background-setting request (i.e., a request to set a virtual background) for a target user device of a target conference participant is received. In an example, the request may be received from a target conference participant at a target user device. That is, the background-setting request can be generated in response to a user input received from the target conference participant. In another example, the request may be received at a server from a target device. The background-setting request identifies a source conference participant. A source user device of the source conference participant can be configured to use a virtual background (VBG) image.

At 904, a replacement VBG is obtained based on the background-setting request and the VBG image of (i.e., used at) the source user device. The replacement VBG is used to set a VBG at the target user device.

In an example, obtaining the replacement VBG based on the background-setting request and the VBG image of the source user device can include obtaining an output image from the source user device. The output image can be segmented into a foreground segment and a background segment using an image segmentation machine learning model. An inpainting machine learning model can be used to obtain the replacement VBG from the background segment. In an example, obtaining the replacement VBG based on the background-setting request and the VBG image of the source conference participant can include determining that the source user device is using an image file that is stored at the source user device as the VBG image. A request for the image file can be transmitted to the source user device. The image file can then be received from the source user device.

In an example, the image file can be stored at the target user device so that the image file is accessible to the target user. As such, the target user can use the image file to set a VBG, such as in other conferences. In another example, the image file is not stored at the target user device in such a way that it is accessible to the target user. That is, the image file is inaccessible to the target user. As such, the target user cannot use the image file in any other conferences. In an example, the image file may be stored in volatile memory during the conference. In an example, the image file may be stored as a hidden file in a permanent storage and deleted when the conference terminates. Other ways of making the image file inaccessible to the target user are possible.

In an example, obtaining the replacement VBG based on the background-setting request and the VBG image of the source conference participant can include determining that the source user device is using an image file that is stored at a conferencing server as the VBG. The image file can then be transmitted to the target device. In an example, obtaining the replacement VBG based on the background-setting request and the VBG image of the source conference participant can include receiving an image from the source user device. A background segment can be obtained from the image. The background segment excludes at least a portion of a likeness of the source conference participant. The background segment can be used as the replacement VBG. In an example, an image mask that is based on the background segment can be transmitted as the replacement VBG.

In an example, obtaining the replacement VBG based on the background-setting request and the VBG image of the source conference participant can include obtaining, using a machine learning model, a list of objects in the VBG image. A selection of an object of the list of objects can be obtained (e.g., received) from the target conference participant. An image search can be performed using the selected object to obtain matching images. One of the matching images can be set as the replacement VBG.

In an example, the technique 900 can include partitioning the replacement VBG into portions corresponding to a number of participants in a virtual conference that includes the target conference participant and the source conference participant. An indication of one of the portions of the replacement VBG can be transmitted to the target user device as the replacement VBG. In an example, the technique 900 can include transmitting a permission request to the source conference participant requesting permission from the source conference participant to obtain the VBG image of the source user device.

In an example, the background-setting request can include image data that is a portion of the VBG image. The image data can be obtained, such as from the target user who may use a screen clipping tool to obtain the image data. Obtaining the replacement VBG can then include performing an image search to identify a set of images matching the portion of the VBG image. One of the images of the set of images can be used as the replacement VBG. The target conference participant can select the image to use as the replacement VBG from the set of images.

In an example, the technique 900 can include partitioning the replacement VBG into portions. An arrangement of conference participants can be obtained. Respective foreground segments of the conference participants can be overlayed on corresponding portions of the replacement VBG based on the arrangement.

In an example, the technique 900 can include obtaining an arrangement of conference participants. The replacement VBG can be partitioned into image portions according to the arrangement. Respective foreground segments are obtained from received output images of the conference participants. The image portions can be assigned to the respective foreground segments. The respective foreground segments can be overlaid onto the image portions based on the arrangement.

Figure 10:
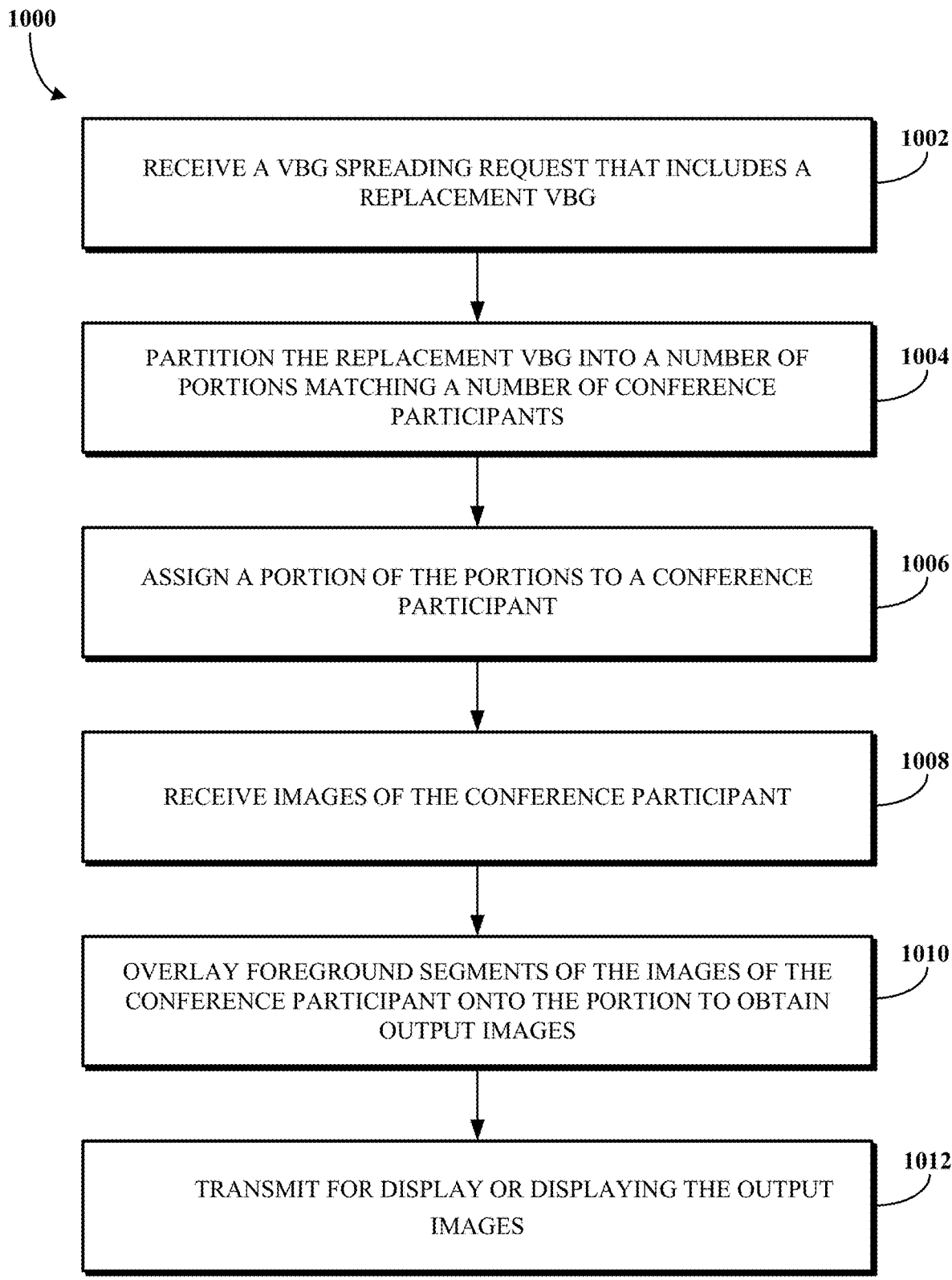
FIG. 10 is a flowchart of an example of a technique for spreading a virtual background to multiple conference participants.

FIG. 10 is a flowchart of an example of a technique 1000 for spreading a VBG to multiple conference participants. The technique 1000 can be executed using computing devices, such as the systems, hardware, and software described with respect to FIGS. 1-8B. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof. The technique 1000 can be implemented in whole or in part by a VBG software, such as the VBG software 500 of FIG. 5. The VBG software may be available or executing at a target user device or a server device.

At 1002, a VBG spreading request that includes a replacement VBG is received. For example, one of the conference participants may invoke a command, such as the command 624 of FIG. 6A, indicating that a replacement VBG is to be spread to more than one conference participant. The VBG spreading request can include the conference participants for whom the replacement VBG is to be spread. In an example, the virtual background spreading request can indicate or include a second conference participant. For example, the replacement VBG may be or may be obtained from a VBG of a second conference participant.

In an example, the conference participants may be selected from a list, such as described with respect to the participants list 682 of FIG. 6C. In an example, if the VBG spreading request does not include a list of conference participants, then the technique 1000 can spread the replacement to all of the conference participants of a current conference. In an example, the conference participants may be obtained according to a configuration (e.g., a rule), such as described with respect to the VBG rules tool 518 of FIG. 5. As mentioned above, the VBG spreading request can include that the replacement VBG is to be spread to the conference participants while preserving the continuity of the replacement VBG.

In an example, the technique 1000 receives a background replacement image. The background replacement image is segmented, such as into a replacement image foreground segment and a replacement image background segment. The replacement VBG can be obtained from the replacement image background segment. In an example, the replacement VBG can be the replacement image background segment. In another example, the replacement VBG can be as described with respect to target VBG 656 of FIG. 6C. In another example, the replacement VBG can be obtained from an image completion software that receives the replacement image background segment and fills in an area of the replacement VBG corresponding to one of the foreground segments using the replacement image background segment.

At 1004, the replacement VBG is partitioned into a number of portions matching a number of conference participants to whom the replacement VBG is to be spread. In an example, the replacement VBG is partitioned into portions according to an arrangement of the conference participants. At 1006, the technique 1000 assigns one of the portions to a conference participant. More generally, each of the conference participants can be assigned one of the portions. Assigning a portion of the replacement VBG to a conference participant means that a likeness of the conference participant is to be displayed on top of (e.g., is to overlay) the portion assigned to the conference participant.

At 1008, images of the conference participant are received. The images can be camera images or output images, as described above. At 1010, foreground segments of the images of the conference participant are overlayed onto (e.g., combined with) the corresponding portions to obtain output images. At 1012, the output images can be transmitted for display or displayed. For example, when the technique 1000 is implemented at the server, the server transmits the output images to a user device for display. When the technique 1000 is implemented at a user device, a conferencing software of the user device can display the output images.

In an example, the technique 1000 can include re-partitioning the replacement VBG according to a new arrangement of the conference participants. The new arrangement is different from an arrangement used for partitioning the replacement VBG into the portions. A different (e.g., second) portion may be assigned to the conference participant. Foreground segments of images of the conference participant received after the re-partitioning are overlayed onto the different portion to obtain new output images. The new output image can be transmitted for display or can be displayed.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method also includes receiving a background-setting request for a target user device of a target conference participant, where the background-setting request identifies a source conference participant, and where a source user device of the source conference participant is configured to use a virtual background (VBG) image; and obtaining a replacement VBG based on the background-setting request and the VBG image used at the source user device, where the replacement VBG is used to set a VBG at the target user device. Other embodiments of this aspect include corresponding computer systems, apparatus, and computer programs recorded on one or more computer storage devices, each configured to perform the actions of the methods.

Implementations may include one or more of the following features. The method where obtaining the replacement VBG based on the background-setting request and the VBG image used at the source user device may include: obtaining an output image from the source user device; segmenting, using an image segmentation machine learning model, the output image into a foreground segment and a background segment; and using an inpainting machine learning model to obtain the replacement VBG from the background segment.

The method may include transmitting an indication of the replacement VBG to the target user device. Obtaining the replacement VBG based on the background-setting request and the VBG image used at the source user device may include determining that the source user device is using an image file that is stored at the source user device as the VBG image; transmitting a request for the image file to the source user device; receiving the image file from the source user device; and storing the replacement VBG on the target user device.

Obtaining the replacement VBG based on the background-setting request and the VBG image used at the source user device may include determining that the source user device is using an image file that is stored at a conferencing server as the VBG; and transmitting the image file to the target user device, where the image file is inaccessible to a target user of the target user device. The background-setting request includes image data that is a portion of the VBG image, and where obtaining the replacement VBG may include performing an image search to identify a set of images matching the portion of the VBG image; and using one of the images of the set of images as the replacement VBG.

Obtaining the replacement VBG based on the background-setting request and the VBG image used at the source user device may include receiving an image from the source user device; obtaining a background segment from the image, where the background segment excludes at least a portion of a likeness of the source conference participant; and using the background segment as the replacement VBG.

Obtaining the replacement VBG based on the background-setting request and the VBG image used at the source user device may include receiving an image from the target user device; obtaining a background segment from the image, where the background segment excludes a likeness of the source conference participant; and transmitting an image mask based on the background segment as the replacement VBG.

The method may include partitioning the replacement VBG into portions corresponding to a number of participants in a virtual conference that includes the target conference participant and the source conference participant; and transmitting an indication of one of the portions of the replacement VBG to the target user device.

The method may include transmitting a permission request to the source conference participant requesting permission from the source conference participant to obtain the VBG image of the source user device.

The instructions to obtain the replacement VBG based on the background-setting request and the VBG image used at the source user device may include instructions to obtain, using a machine learning model, a list of objects in the VBG image; obtain a selection of an object of the list of objects from the target conference participant; perform an image search using the selected object to obtain matching images; and set one of the matching images as the replacement VBG.

The processor is further configured to execute instructions to partition the replacement VBG into portions; obtain an arrangement of conference participants; and overlay respective foreground segments of the conference participants on corresponding portions of the replacement VBG based on the arrangement. The processor is further configured to execute instructions to obtain an arrangement of conference participants; partition the replacement VBG into image portions according to the arrangement; obtain respective foreground segments from received output images of the conference participants; assign the image portions to the respective foreground segments; and overlay, based on the arrangement, the respective foreground segments onto the image portions.

Obtaining the replacement VBG based on the background-setting request and the VBG image used at the source user device may include determining that the source user device is using an image file that is stored at the source user device as the VBG image; transmitting a request for the image file to the source user device; and receiving the image file from the source user device.

Obtaining the replacement VBG based on the background-setting request and the VBG image used at source user device may include determining that the source user device is using an image file that is stored at a conferencing server as the VBG; and transmitting the image file to the target user device. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method implemented by a target user device for managing virtual background (VBG) images during a virtual conference, comprising:
    presenting, by the target user device, a user interface associated with the virtual conference, wherein the virtual conference includes the target user device associated with a target conference participant and a source user device associated with a source conference participant;
    receiving, by the target user device and via the user interface, a background-setting request for the target user device, wherein the background-setting request identifies the source conference participant, wherein the source user device is configured to use a VBG image, wherein the VBG image is used in a first video stream that includes an image of the source conference participant and that initiates from the source user device, and wherein the background-setting request is generated in response to a user input received from the target conference participant via a user interface element of the user interface; and obtaining, by the target user device, a replacement VBG based on the background-setting request and the VBG image used at the source user device; and using, by the target user device, the replacement VBG to set a VBG at the target user device in a second video stream that includes an image of the target conference participant, that initiates from the target user device, and that is different from the first video stream.

2. The method of claim 1, wherein obtaining, by the target user device, the replacement VBG based on the background-setting request and the VBG image used at the source user device comprises:

obtaining an output image from the source user device;
segmenting, using an image segmentation machine learning model, the output image into a foreground segment and a background segment; and
using an inpainting machine learning model to obtain the replacement VBG from the background segment.

3. The method of claim 1, further comprising:
transmitting, by the target user device, an indication of the replacement VBG to the target user device.

4. The method of claim 1, wherein obtaining, by the target user device, the replacement VBG based on the background-setting request and the VBG image used at the source user device comprises:

determining that the source user device is using an image file that is stored at the source user device as the VBG image;
transmitting a request for the image file to the source user device;
receiving the image file from the source user device; and
storing the replacement VBG on the target user device.

5. The method of claim 1, wherein obtaining, by the target user device, the replacement VBG based on the background-setting request and the VBG image used at the source user device comprises:

determining that the source user device is using an image file that is stored at a conferencing server as the VBG; and
transmitting the image file to the target user device, wherein the image file is inaccessible to a target user of the target user device.

6. The method of claim 1,
wherein the background-setting request includes image data that is a portion of the VBG image, and
wherein obtaining, by the target user device, the replacement VBG comprises:
performing an image search to identify a set of images matching the portion of the VBG image; and
using one of the images of the set of images as the replacement VBG.

7. The method of claim 1, wherein obtaining, by the target user device, the replacement VBG based on the background-setting request and the VBG image used at the source user device comprises:

receiving an image from the source user device;
obtaining a background segment from the image, wherein the background segment excludes at least a portion of a likeness of the source conference participant; and
using the background segment as the replacement VBG.

8. The method of claim 1, wherein obtaining, by the target user device, the replacement VBG based on the background-setting request and the VBG image used at the source user device comprises:

receiving an image from the target user device;
obtaining a background segment from the image, wherein the background segment excludes a likeness of the source conference participant; and
transmitting an image mask based on the background segment as the replacement VBG.

9. The method of claim 1, further comprising:
partitioning the replacement VBG into portions corresponding to a number of participants in the virtual conference that includes the target conference participant and the source conference participant; and
transmitting an indication of one of the portions of the replacement VBG to the target user device.

10. The method of claim 1, further comprising:
transmitting, by the target user device, a permission request to the source conference participant requesting permission from the source conference participant to obtain the VBG image of the source user device.

11. A device for managing virtual background (VBG) images during a virtual conference, comprising:
a memory; and
a processor, the processor configured to execute instructions stored in the memory to:
present a user interface associated with the virtual conference, wherein the virtual conference includes the device associated with a target conference participant and a source user device associated with a source conference participant;
receive, via the user interface, a background-setting request for the device, wherein the background-setting request indicates the source conference participant, wherein the source user device is configured to use a VBG image, and wherein the VBG image is used in a first video stream that includes an image of the source conference participant and that initiates from the source user device, wherein the background-setting request is generated in response to a user input received from the target conference participant via a user interface element of the user interface; and
obtain a replacement VBG based on the background-setting request and the VBG image used at the source user device; and
use the replacement VBG to set a VBG at the device in a second video stream that includes an image of the target conference participant, that initiates from the device, and that is different from the first video stream.

12. The device of claim 11, wherein the instructions to obtain the replacement VBG based on the background-setting request and the VBG image used at the source user device comprise instructions to:
obtain, using a machine learning model, a list of objects in the VBG image;
obtain a selection of an object of the list of objects from the target conference participant;
perform an image search using the object to obtain matching images; and
set one of the matching images as the replacement VBG.

13. The device of claim 11, wherein the processor is further configured to execute instructions to:
partition the replacement VBG into portions;
obtain an arrangement of conference participants; and
overlay respective foreground segments of the conference participants on corresponding portions of the replacement VBG based on the arrangement.

14. The device of claim 11, wherein the processor is further configured to execute instructions to:

obtain an arrangement of conference participants;
partition the replacement VBG into image portions according to the arrangement;
obtain respective foreground segments from received output images of the conference participants;
assign the image portions to the respective foreground segments; and
overlay, based on the arrangement, the respective foreground segments onto the image portions.

15. The device of claim 11, wherein the instructions to obtain the replacement VBG based on the background-setting request and the VBG image of the source user device comprises instructions to:
obtain a selection of an output image that is displayed at the device;
segment, using an image segmentation machine learning model, the output image into a foreground segment and a background segment; and
provide the background segment to an inpainting machine learning model to obtain the replacement VBG.

16. The device of claim 11, wherein the processor is further configured to:
transmit a permission request to the source conference participant to request permission from the source conference participant to obtain the VBG image of the source user device.

17. A non-transitory computer readable medium storing instructions operable to cause one or more processors of a target user device to perform operations for managing virtual background (VBG) images during a virtual conference, the operations comprising:
presenting, by the target user device, a user interface associated with the virtual conference, wherein the virtual conference includes the target user device associated with a target conference participant and a source user device associated with a source conference participant;
receiving, by the target user device via the user interface, a background-setting request for the target user device, wherein the background-setting request identifies the source conference participant, wherein the source user device is configured to use a VBG image, and wherein the VBG image is used in a first video stream that includes an image of the source conference participant and that initiates from the source user device, and wherein the background-setting request is generated in response to a user input received from the target conference participant via a user interface element of the user interface; and
obtaining, by the target user device, a replacement VBG based on the background-setting request and the VBG image used at the source user device; and
using, by the target user device, the replacement VBG to set a VBG at the target user device in a second video stream that includes an image of the target conference participant, that initiates from the target user device, and that is different from the first video stream.

18. The non-transitory computer readable medium of claim 17, wherein obtaining the replacement VBG based on the background-setting request and the VBG image used at the source user device comprises:
obtaining an output image from the source user device;
segmenting, using an image segmentation machine learning model, the output image into a foreground segment and a background segment; and
using an inpainting machine learning model to obtain the replacement VBG from the background segment.

19. The non-transitory computer readable medium of claim 17, wherein obtaining the replacement VBG based on the background-setting request and the VBG image used at the source user device comprises:
determining that the source user device is using an image file that is stored at the source user device as the VBG image;
transmitting a request for the image file to the source user device; and
receiving the image file from the source user device.

20. The non-transitory computer readable medium of claim 17, wherein obtaining the replacement VBG based on the background-setting request and the VBG image used at source user device comprises:
determining that the source user device is using an image file that is stored at a conferencing server as the VBG; and
transmitting the image file to the target user device.

* * * * *